United States Patent
Dick et al.

(10) Patent No.: US 9,943,975 B2
(45) Date of Patent: Apr. 17, 2018

(54) SAW SYSTEM FOR MITER JOINTS

(71) Applicant: Precision Automation, Inc., Vancouver, WA (US)

(72) Inventors: Spencer B. Dick, Portland, OR (US); Brennan J. McClure, Vancouver, WA (US); Minh Dat Ba Tran, Vancouver, WA (US)

(73) Assignee: Precision Automation, Inc., Vancouver, WA (US)

(*) Notice: Subject to any disclaimer, the term of this patent is extended or adjusted under 35 U.S.C. 154(b) by 759 days.

(21) Appl. No.: 13/755,970

(22) Filed: Jan. 31, 2013

(65) Prior Publication Data

US 2013/0205564 A1 Aug. 15, 2013

Related U.S. Application Data

(60) Provisional application No. 61/593,754, filed on Feb. 1, 2012.

(51) Int. Cl.
*B26D 3/02* (2006.01)
*B27B 27/10* (2006.01)
*B23D 59/00* (2006.01)

(52) U.S. Cl.
CPC ............. *B26D 3/02* (2013.01); *B23D 59/008* (2013.01); *B27B 27/10* (2013.01);
(Continued)

(58) Field of Classification Search
CPC ..... Y10T 83/141; Y10T 83/05; Y10T 83/145; Y10T 83/148; Y10T 83/152;
(Continued)

(56) References Cited

U.S. PATENT DOCUMENTS

| 491,307 A | 2/1893 | Gaylord |
| 1,271,473 A | 7/1918 | Johnson |

(Continued)

FOREIGN PATENT DOCUMENTS

| CA | 2793433 A1 | 12/2010 |
| DE | 3941019 C2 | 5/1995 |

(Continued)

OTHER PUBLICATIONS

Canadian Intellectual Property Office, Office Action regarding Canadian Patent Application No. 2,793,433, dated Aug. 15, 2014, 2 pages.

(Continued)

*Primary Examiner* — Phong Nguyen
(74) *Attorney, Agent, or Firm* — Kolisch Hartwell, P.C.

(57) ABSTRACT

Saw system, including methods and apparatus, for cutting pieces of stock to be installed end-to-end to form miter joints. In some embodiments, the saw system may include a computer that determines an appropriate saw pivot angle for cutting a proximal end of a second piece of stock, based on a corner angle entered for cutting a distal end of a first piece of stock. In some embodiments, the saw system may compensate for an offset pivot axis of a saw device based on entered lengths of cut first and second pieces generated respectively with the saw device pivoted to the left and to the right.

19 Claims, 14 Drawing Sheets

(52) U.S. Cl.
CPC ...... *Y10T 29/49826* (2015.01); *Y10T 29/5176* (2015.01); *Y10T 83/05* (2015.04)

(58) Field of Classification Search
CPC ... Y10T 83/162; Y10T 83/173; Y10T 83/175; Y10T 83/178; Y10T 83/18; Y10T 83/5815; Y10T 83/7593; Y10T 83/7607; Y10T 83/7613; Y10T 83/762; Y10T 83/7627; Y10T 83/8773; Y10T 83/7697; Y10T 83/7701; Y10T 83/7705; Y10T 83/7722; Y10T 83/7726; Y10T 83/849; Y10T 83/853; Y10T 83/04; Y10T 83/159; Y10T 83/667; Y10T 83/68; Y10T 83/76; Y10T 83/7633; Y10T 83/764; Y10T 83/7647; Y10T 83/7233; Y10T 83/7239; Y10T 29/49826; Y10T 29/5176; B26D 3/00; B26D 3/02; B26D 5/00; B26D 5/005; B26D 5/20; B26D 5/22; B26D 5/24; B26D 5/26; B27L 35/00; B27L 35/16; B27L 35/22; B27L 35/24; B27L 27/00; B27L 27/04; B27L 27/06; B27L 27/08; B27L 27/10; G05B 19/00; G05B 19/402; G05B 19/18; G05B 19/409; G05B 19/41; B23D 59/008; B27B 5/00; B27B 5/16; B27B 5/22; B27B 5/24; B27B 27/00; B27B 27/04; B27B 27/06; B27B 27/08; B27B 27/10

See application file for complete search history.

(56) References Cited

U.S. PATENT DOCUMENTS

| | | |
|---|---|---|
| 2,315,458 A | 3/1943 | Sellmeyer |
| 2,577,766 A | 12/1951 | Johnson et al. |
| 2,602,477 A | 7/1952 | Kniff |
| 2,731,989 A | 1/1956 | Valcourt et al. |
| 2,740,437 A | 4/1956 | Odium et al. |
| 2,852,049 A | 9/1958 | Peterson |
| 3,170,736 A | 2/1965 | Wright |
| 3,186,453 A | 6/1965 | Green |
| 3,329,181 A | 7/1967 | Buss et al. |
| 3,459,246 A | 8/1969 | Ottosson |
| 3,524,708 A | 8/1970 | Rabian et al. |
| 3,552,254 A | 1/1971 | Marczy |
| 3,566,239 A | 2/1971 | Taniguchi |
| 3,584,284 A | 6/1971 | Beach et al. |
| 3,626,792 A | 12/1971 | Eichenhofer |
| 3,736,968 A | 6/1973 | Mason |
| 3,738,403 A | 6/1973 | Schwoch et al. |
| 3,780,777 A | 12/1973 | Davies |
| 3,811,353 A | 5/1974 | Miles |
| 3,814,153 A | 6/1974 | Schmidt |
| 3,841,462 A | 10/1974 | Schmidt |
| 3,854,889 A | 12/1974 | Lemelson |
| 3,886,372 A | 5/1975 | Sanglert |
| 3,910,142 A | 10/1975 | Jureit et al. |
| 3,917,078 A | 11/1975 | Schmidt |
| 3,941,019 A | 3/1976 | Baldwin et al. |
| 3,994,484 A | 11/1976 | Schorr |
| 4,055,097 A | 10/1977 | Ducret |
| 4,111,088 A | 9/1978 | Ziegelmeyer |
| 4,144,449 A | 3/1979 | Funk et al. |
| 4,221,974 A | 9/1980 | Mueller et al. |
| 4,260,001 A | 4/1981 | De Muynck |
| 4,286,880 A | 9/1981 | Young |
| 4,358,166 A | 11/1982 | Antoine |
| 4,410,025 A | 10/1983 | Sicotte |
| 4,434,693 A | 3/1984 | Hosoi et al. |
| 4,445,877 A | 5/1984 | Love et al. |
| 4,453,838 A | 6/1984 | Loizeau |
| 4,454,794 A | 6/1984 | Thornton |
| 4,469,318 A | 9/1984 | Slavic |
| 4,472,783 A | 9/1984 | Johnstone et al. |
| 4,499,933 A | 2/1985 | Thompson |
| 4,541,722 A | 9/1985 | Jenks |
| 4,596,172 A | 6/1986 | Visser |
| 4,628,459 A | 12/1986 | Shinohara et al. |
| 4,658,687 A | 4/1987 | Haas et al. |
| 4,694,871 A | 9/1987 | Jenkner |
| 4,725,961 A | 2/1988 | Pearl |
| 4,736,511 A | 4/1988 | Jenkner |
| 4,791,757 A | 12/1988 | Orlando |
| 4,805,505 A | 2/1989 | Cantlin |
| 4,830,075 A | 5/1989 | Jenkner |
| 4,874,996 A | 10/1989 | Rosenthal |
| 4,878,524 A | 11/1989 | Rosenthal et al. |
| 4,879,752 A | 11/1989 | Aune et al. |
| 4,901,992 A | 2/1990 | Dobeck |
| 4,939,738 A | 7/1990 | Opower |
| 4,939,739 A | 7/1990 | Hobart et al. |
| 5,001,955 A | 3/1991 | Fujiwara |
| 5,014,583 A | 5/1991 | Webb et al. |
| 5,042,341 A | 8/1991 | Greten et al. |
| 5,048,816 A | 9/1991 | Chun et al. |
| 5,054,938 A | 10/1991 | Ide |
| 5,058,474 A | 10/1991 | Herrera |
| 5,094,282 A | 3/1992 | Suzuki et al. |
| 5,142,158 A | 8/1992 | Craig, Jr. |
| 5,176,060 A | 1/1993 | Thornton |
| 5,196,101 A | 3/1993 | Thakoor |
| 5,197,172 A | 3/1993 | Takagi et al. |
| 5,201,258 A | 4/1993 | Cremona |
| 5,201,351 A | 4/1993 | Hurdle, Jr. |
| 5,251,142 A | 10/1993 | Cramer |
| 5,254,859 A | 10/1993 | Carman et al. |
| 5,266,878 A | 11/1993 | Makino et al. |
| 5,365,812 A | 11/1994 | Hamden |
| 5,418,729 A | 5/1995 | Holmes et al. |
| 5,443,554 A | 8/1995 | Robert |
| 5,444,635 A | 8/1995 | Blaine et al. |
| 5,460,070 A | 10/1995 | Buskness |
| 5,472,028 A | 12/1995 | Faulhaber |
| 5,489,155 A | 2/1996 | Ide |
| 5,524,514 A | 6/1996 | Hadaway et al. |
| 5,663,882 A | 9/1997 | Douglas |
| 5,664,888 A | 9/1997 | Sabin |
| RE35,663 E | 11/1997 | Mori et al. |
| 5,772,192 A | 6/1998 | Hoffmann |
| 5,797,685 A | 8/1998 | Jurik et al. |
| 5,798,929 A | 8/1998 | Stenzel et al. |
| 5,829,892 A | 11/1998 | Groves |
| 5,845,555 A | 12/1998 | Dawley |
| 5,865,080 A | 2/1999 | Jackson |
| 5,933,353 A | 8/1999 | Abriam et al. |
| 5,938,344 A | 8/1999 | Sabin |
| 5,953,232 A | 9/1999 | Blaimschein |
| 5,960,104 A | 9/1999 | Conners et al. |
| 5,964,536 A | 10/1999 | Kinoshita |
| 5,970,830 A | 10/1999 | von Niederhäusern |
| 6,058,589 A | 5/2000 | Hakansson |
| 6,062,280 A | 5/2000 | Newnes et al. |
| 6,120,628 A | 9/2000 | Pritelli |
| 6,144,895 A | 11/2000 | Govindaraj et al. |
| 6,196,101 B1 | 3/2001 | Van Den Bulcke |
| 6,216,574 B1 | 4/2001 | Hain |
| 6,240,822 B1 | 6/2001 | Musser |
| 6,263,773 B1 | 7/2001 | McAdoo et al. |
| 6,272,437 B1 | 8/2001 | Woods et al. |
| 6,314,379 B1 | 11/2001 | Hu et al. |
| 6,379,048 B1 | 4/2002 | Brissette |
| 6,390,159 B1 | 5/2002 | Pinske |
| 6,422,111 B1 | 7/2002 | Rousseau |
| 6,463,352 B1 | 10/2002 | Tadokoro et al. |
| 6,470,377 B1 | 10/2002 | Sevcik et al. |
| 6,474,378 B1 | 11/2002 | Ryan et al. |
| 6,480,757 B1 | 11/2002 | Susnjara |
| 6,510,361 B1 | 1/2003 | Govindaraj et al. |
| 6,520,228 B1 | 2/2003 | Kennedy et al. |
| 6,549,438 B2 | 4/2003 | Malone |
| 6,594,590 B2 | 7/2003 | Woods et al. |
| 6,618,692 B2 | 9/2003 | Takahashi et al. |

(56) References Cited

U.S. PATENT DOCUMENTS

| | | |
|---|---|---|
| 6,631,006 B2 | 10/2003 | Dick et al. |
| 6,662,074 B2 | 12/2003 | Pugh et al. |
| 6,675,685 B2 | 1/2004 | Ceroll et al. |
| 6,690,990 B1 | 2/2004 | Caron et al. |
| 6,698,159 B2 | 3/2004 | Harris et al. |
| 6,701,259 B2 | 3/2004 | Dor et al. |
| 6,735,493 B1 | 5/2004 | Chou et al. |
| 6,764,434 B1 | 7/2004 | Volk |
| 6,827,476 B2 | 12/2004 | Lowry et al. |
| 6,880,695 B2 | 4/2005 | Suzuki et al. |
| 6,886,462 B2 | 5/2005 | Dick et al. |
| 6,898,478 B2 | 5/2005 | Dick et al. |
| 6,941,864 B2 | 9/2005 | Dick et al. |
| 7,021,096 B2 | 4/2006 | Barnett |
| 7,036,411 B1 | 5/2006 | Harris et al. |
| 7,073,422 B2 | 7/2006 | Dick |
| 7,080,431 B2 | 7/2006 | Sawyer et al. |
| 7,168,353 B2 | 1/2007 | Dick et al. |
| 7,171,738 B2 | 2/2007 | Dick et al. |
| 7,245,981 B2 | 7/2007 | Dick et al. |
| 7,419,047 B2 | 9/2008 | Cesselli et al. |
| 7,428,443 B2 | 9/2008 | Dick |
| 7,483,765 B2 | 1/2009 | Dick et al. |
| 8,093,842 B2 | 1/2012 | Bergeron et al. |
| 8,783,140 B2 | 7/2014 | Dick et al. |
| 2003/0033920 A1 | 2/2003 | Parks et al. |
| 2004/0027038 A1 | 2/2004 | Gaesser et al. |
| 2004/0154449 A1 | 8/2004 | Parks et al. |
| 2005/0054502 A1 | 3/2005 | Benyovits |
| 2005/0098004 A1 | 5/2005 | Dick et al. |
| 2005/0167000 A1 | 8/2005 | Dick |
| 2005/0268764 A1 | 12/2005 | Hadaway et al. |
| 2006/0006701 A1 | 1/2006 | Wells |
| 2006/0065086 A1 | 3/2006 | Swopes et al. |
| 2006/0104551 A1 | 5/2006 | Schneeberger et al. |
| 2006/0206233 A1 | 9/2006 | Carpenter et al. |
| 2007/0028730 A1 | 2/2007 | Sawyer et al. |
| 2007/0084075 A1* | 4/2007 | Kawano ............... B23D 59/002 33/640 |
| 2007/0084323 A1 | 4/2007 | Parks et al. |
| 2007/0240547 A1 | 10/2007 | Dick et al. |
| 2007/0245872 A1 | 10/2007 | Kelly |
| 2008/0009961 A1 | 1/2008 | Dick et al. |
| 2008/0034934 A1 | 2/2008 | Mekkelsen et al. |
| 2009/0299519 A1 | 12/2009 | Dick et al. |
| 2011/0056344 A1 | 3/2011 | Dick et al. |
| 2011/0175273 A1 | 7/2011 | Dick et al. |
| 2013/0036890 A1 | 2/2013 | Dick et al. |
| 2013/0211576 A1 | 8/2013 | Dick et al. |

FOREIGN PATENT DOCUMENTS

| | | |
|---|---|---|
| EP | 2440356 | 4/2012 |
| JP | 3941019 B2 | 7/2007 |
| WO | 20100144630 A1 | 12/2010 |

OTHER PUBLICATIONS

Precision Automation Inc., "TigerStop Application Guide", Application Guide for PF90 Computer Controlled Saw, 2000, 12 pages.
TigerStop LLC, TigerStop Catalog, 2008, 32 pages.
TigerStop LLC, "Motor Replacement / Belt Replacement", TigerStop Instruction Guide, Apr. 2008, 16 pages.
U.S. Patent and Trademark Office, Office Action regarding U.S. Appl. No. 11/711,497, dated Apr. 8, 2008, 24 pages.
TigerStop LLC., "Sustainable Solutions for Lean Manufacturing", TigerStop Catalog, 2009, 62 pages.
TigerStop LLC., "The Basic TigerStop", TigerStop Manual 4.72, 2009, 1 page. www.tigerstop.com/tigerstop/The_Basic_TigerStop.htm.
U.S. Patent and Trademark Office, Office Action regarding U.S. Appl. No. 12/360,091, dated Mar. 24, 2010, 23 pages.
The International Bureau of WIPO, "International Search Report and Written Opinion of the International Searching Authority" regarding PCT Application No. PCT/US2010/038047, dated Sep. 10, 2010, 16 pages.
U.S. Patent and Trademark Office, Office Action regarding U.S. Appl. No. 12/889,827, dated Sep. 28, 2011, 8 pages.
The International Bureau of WIPO, "International Preliminary Report on Patentability" regarding PCT Patent Application No. PCT/US2010/038047, dated Dec. 12, 2011, 12 pages.
U.S. Patent and Trademark Office, Office Action regarding U.S. Appl. No. 12/797,581, dated Jan. 18, 2013, 23 pages.
U.S. Patent and Trademark Office, Office Action regarding U.S. Appl. No. 13/544,795, dated Jul. 18, 2013, 31 pages.
U.S. Patent and Trademark Office, Office Action regarding U.S. Appl. No. 13/659,818, dated Oct. 7, 2013, 26 pages.
U.S. Patent and Trademark Office, Office Action regarding U.S. Appl. No. 12/797,581, dated Nov. 8, 2013, 11 pages.
U.S. Patent and Trademark Office, Office Action regarding U.S. Appl. No. 14/337,096, dated Dec. 30, 2016, 36 pages.
U.S. Patent and Trademark Office, Office Action regarding U.S. Appl. No. 14/337,096, dated Aug. 2, 2017, 12 pages.

* cited by examiner

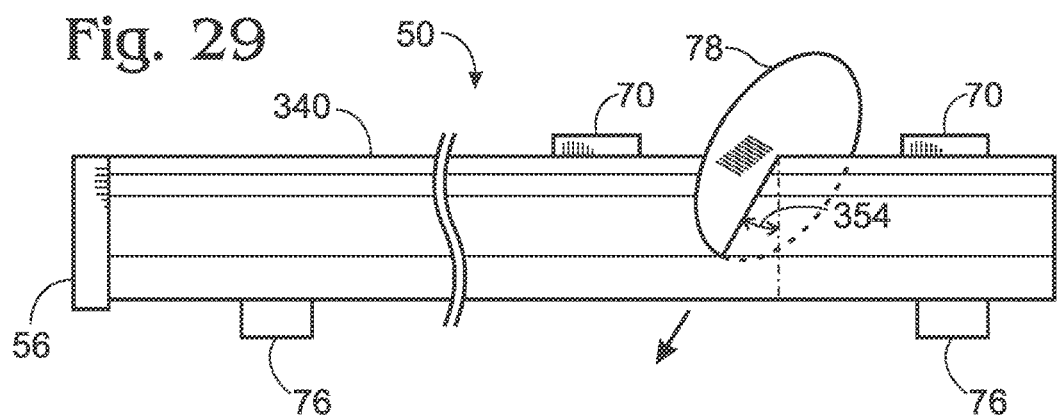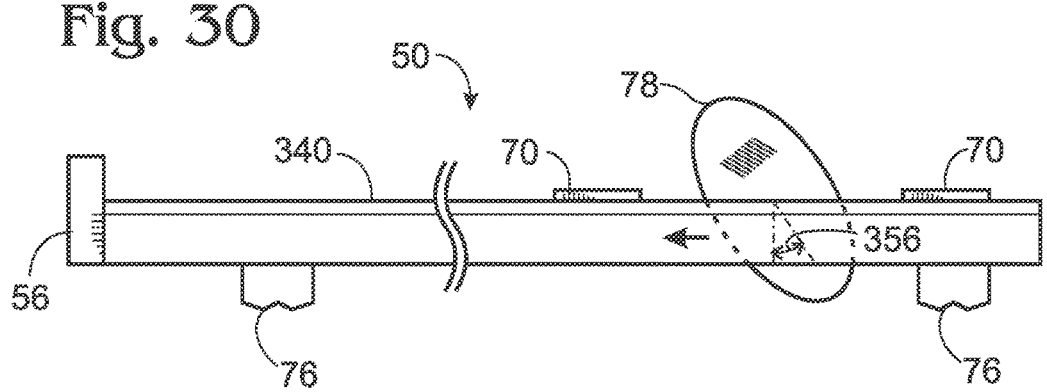

SAW SYSTEM FOR MITER JOINTS

CROSS-REFERENCE TO PRIORITY APPLICATION

This application is based upon and claims the benefit under 35 U.S.C. § 119(e) of U.S. Provisional Patent Application Ser. No. 61/593,754, filed Feb. 1, 2012, which is incorporated herein by reference in its entirety for all purposes.

CROSS-REFERENCE TO OTHER APPLICATION

This application incorporates by reference in its entirety for all purposes U.S. Patent Application Publication No. 2011/0056344 A1, published Mar. 10, 2011.

INTRODUCTION

Computer-controlled positioning systems, also termed gauge systems, are commonly used in manufacturing environments to position workpieces, such as pieces of lumber, pipes, conduits, sheet metal, extrusions, or the like, quickly and accurately relative to a processing tool, such as a saw. In stop-based gauge systems, a stop serves as a movable fence that contacts an end (or other surface) of a workpiece to set the distance from the end to the processing tool. The stop can be driven along a linear axis (i.e., a measurement axis) to adjust the distance of the stop from the tool according to a target dimension, such as a desired length, for a product to be formed by processing the workpiece with the tool.

Stop-based, linear gauge systems can have various levels of complexity. More sophisticated versions automate control of the tool and use the stop as a pusher to drive movement of the workpiece toward the tool. These pusher-based systems can drive the end of a workpiece toward the tool to multiple stopped positions at which workpiece processing is performed, to create multiple products automatically from a single workpiece. For example, pusher-based systems can create a set of products of desired length automatically based on a cut list. On the other hand, more basic stop-based gauge systems combine a more passive stop with manual control of the tool. With these basic systems, a user manually places a workpiece against the stop after the position of the stop has been set based on a desired target dimension, and then manually controls the tool to process the workpiece.

Many craftsmen, such as framers, finish carpenters, cabinet installers, and cabinetmakers, could benefit from the use of a gauge system to cut pieces with beveled ends for creating miter joints. However, to make the gauge system more attractive to these craftsmen, the system could be improved, for example, to be easier to learn, more accurate at various saw angles, and/or and less likely to induce cutting errors by the user.

SUMMARY

The present disclosure provides a saw system, including methods and apparatus, for cutting pieces of stock to be installed end-to-end to form miter joints. In some embodiments, the saw system may include a computer that determines an appropriate saw pivot angle for cutting a proximal end of a second piece of stock, based on a corner angle entered for cutting a distal end of a first piece of stock. In some embodiments, the saw system may compensate for an offset pivot axis of a saw device based on entered lengths of cut first and second pieces generated respectively with the saw device pivoted to the left and to the right.

BRIEF DESCRIPTION OF THE DRAWINGS

FIG. 29 is a top view of the piece of crown molding and saw system of FIG. 28, as the blade of the saw device is making a tilted cut through the piece, in accordance with aspects of the present disclosure.

FIG. 30 is a front view of the piece of crown molding and saw system of FIG. 29, as the blade of the saw device is making the tilted cut through the piece, in accordance with aspects of the present disclosure.

DETAILED DESCRIPTION

Figure 1:
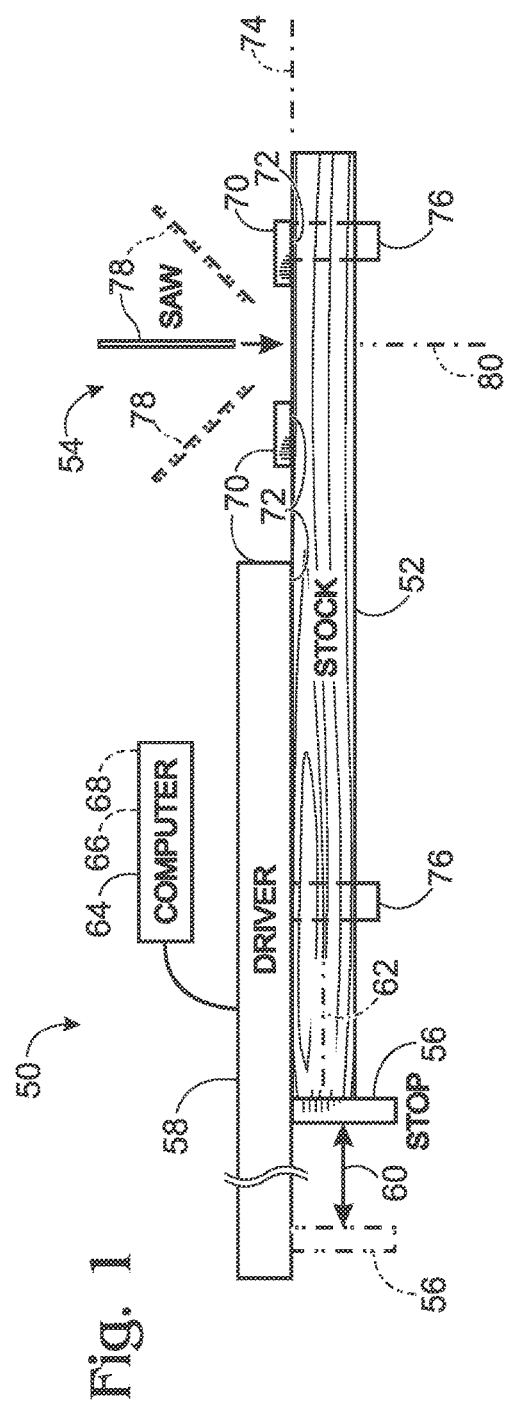
FIG. 1 is a somewhat schematic top view of selected aspects of an exemplary saw system supporting a piece of stock and including a computer-controlled stop and a pivotable saw device oriented to make a square cut through the piece of stock, in accordance with aspects of the present disclosure.

The present disclosure provides a saw system, including methods and apparatus, for cutting pieces of stock to be installed end-to-end to form miter joints. In some embodiments, the saw system may include a computer that determines an appropriate saw pivot angle for cutting a proximal end of a second piece of stock, based on a corner angle entered for cutting a distal end of a first piece of stock. In some embodiments, the saw system may compensate for an offset pivot axis of a saw based on entered lengths of cut first and second pieces generated respectively with the saw pivoted to the left and to the right.

An exemplary method of cutting and installing pieces of stock around a wall structure is provided. In the method, a saw system may be provided. The saw system may include a saw device capable of pivoting to cut pieces of stock at various selectable angles relative to a positioning path. The saw system also may include a stop, a driver capable of moving the stop along the positioning path through a range of distances from the saw device, and a computer programmed to control positioning of the stop along the positioning path. The following may be entered into the computer for a first piece of stock: (a) a proximal corner angle of the wall structure where a proximal end of the first piece will be fixed, (b) a desired length of the first piece, and (c) a distal corner angle of the wall structure where a distal end of the first piece will be fixed. The computer may be allowed to calculate an appropriate position for the stop and pivot angle for the saw device to cut the first piece. The first piece may be cut and installed. The computer may be allowed to determine an appropriate pivot angle for the saw device to cut a proximal end of a second piece of stock based on the distal corner angle entered for the first piece. The proximal end of the second piece may be cut. The following may be entered into the computer for the second piece: (a) a desired length of the second piece and (b) a distal corner angle of the wall structure where a distal end of the second piece will be fixed. The computer may be allowed to calculate an appropriate position for the stop and pivot angle for the saw device to cut a distal end of the second piece. The distal end of the second piece may be cut. The second piece may be installed to form a miter joint with the first piece.

An exemplary method of cutting pieces of stock is provided. In the method, a saw system may be provided. The system may include a saw device defining a cutting plane and capable of pivoting about a pivot axis orthogonal to a positioning path to cut stock pieces at various selectable angles relative to the positioning path. The system also may include a stop, a driver capable of moving the stop along the positioning path through a range of distances from the saw device, and a computer programmed to control positioning of the stop along the positioning path. A first piece of stock may be placed against the stop. The first piece may be cut with the saw device pivoted to the left. The length of the cut first piece may be measured and entered into the computer. A second piece of stock may be placed against the stop. The second piece may be cut with the saw device pivoted to the right. The length of the cut second piece may be measured and entered into the computer. Additional pieces of stock may be cut to desired lengths with the computer calculating appropriate stop positions based on each desired length, a pivot angle of the saw device for cutting the desired length, and the entered lengths of the cut first and second pieces.

A saw system for cutting and installation of miter-cut stock pieces may provide substantial advantages over other saw systems. These advantages may include fewer cutting length mistakes, fewer cutting angle errors, a better approach to entering measurements into the system, fewer user calculations, more accurate cut lengths with various saw angles, or any combination thereof, among others.

Further aspects of the present disclosure are presented in the following sections: (I) exemplary saw system with computer-controlled stop positioning, (II) compensation for an offset pivot axis of a saw device of the system, and (III) exemplary methods of utilizing the saw system to create miter joints.

I. Exemplary Saw System with Computer-Controlled Stop Positioning

Figure 2:
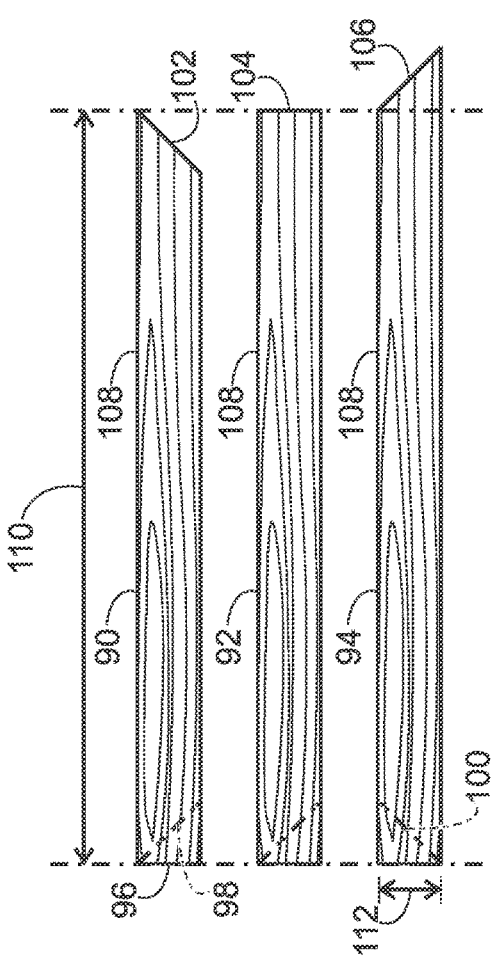
FIG. 2 is a top view of a set of cut pieces of stock generated with the saw system of FIG. 1, with the saw device pivoted to the left, centered (square), and pivoted to the right, respectively, in accordance with aspects of the present disclosure.

This section describes an exemplary saw system 50 for cutting pieces of stock 52 to desired lengths with ends that are square or beveled; see FIGS. 1 and 2.

FIG. 1 shows a somewhat schematic top view of selected aspects of saw system 50 supporting stock piece 52. The system may include a pivotable saw device 54 (interchangeably termed a saw), a stop 56, and a driver 58 operatively connected to stop 56. The driver may be capable of driving movement of the stop, indicated at 60, in both directions parallel to a positioning axis 62 (interchangeably termed a positioning path) of the system, to different distances from saw device 54. Stop 56 may be engaged with an end of piece 52 (e.g., a square or beveled end), to set the longitudinal position of piece 52 and the distance of the stop and the end of the piece from the saw device (and thus to set the length to which piece 52 will be cut).

A computer 64 may be in communication with driver 58, to control the position of the stop along positioning axis 62. As a result, the computer can control the length to which the piece is cut, and can apply any adjustments to the stop position necessary to compensate for miter (angled) cuts at one or both ends of the piece, and/or to compensate for an offset of the saw's pivot axis (see Section II). The computer may include at least one user input interface 66 (such as a keypad, a keyboard, a mouse, a touchscreen, a data port, or the like) to receive user inputs (e.g., a width of the stock, desired lengths of cut pieces, corner angles of a wall structure, a signal to move the stop, a signal to calibrate the system, or the like). The computer also may have at least one output interface 68 (such as a display, a printer, a data port, or the like) to communicate data such as values, status, and settings, to a user. In some cases, the input and output interfaces may be provided by the same device (e.g., a touchscreen).

The system may include a fence 70 arranged parallel to positioning axis 62. For example, fence 70 may be provided by any one or combination of a housing of driver 58 and a pair of fence members that are disposed along positioning axis 62 on opposite sides of a cutting plane defined by the saw device. The fence may provide at least one wall 72, such as at least one front wall, defining a fence plane 74 that includes, and/or is tangential to, the at least one wall. The fence plane may be parallel to positioning axis 62 and may be a vertical plane. Fence 70 may be configured to contact a lateral side of piece 52, to align the piece parallel to positioning axis 62 and to locate a lateral surface region of the piece substantially flush with fence plane 74.

The system further may include a base 76 to support piece 52 from underneath. The base also may support, position/fix, elevate, and/or connect any combination of other system components, such as saw device 54, stop 56, driver 58, computer 64, and/or fence 70. Exemplary bases include a stand, table, saw horse, frame, or the like.

The saw device, which in some cases may be described as a miter saw, a miter chop saw, or a compound miter saw, among others, may be any machine or tool that is capable of cutting through piece 52 at various selectable angles with respect to axis 62. The saw device may have a cutting member or blade 78, which defines a cutting path or cutting plane 80 that can intersect piece 52 orthogonally or obliquely, to produce a square-cut or bevel-cut (mitered) end, respectively. The saw device may be a power saw and may be controlled manually and/or by computer 64, among others. The saw device may have a vertical pivot axis, to produce simple miter cuts that are orthogonal to a horizontal plane, and may have a horizontal pivot axis, to produce compound miter cuts that are oblique with respect to horizontal and vertical planes.

Stock piece 52 may have any suitable properties. The piece may be formed of wood, metal, plastic, or a combination thereof, among others. The piece may be one of a set of pieces of stock. The stock may have any suitable characteristics that are shared within the set, such as the same width, thickness, cross-sectional shape, surface pattern, or any combination thereof, among others.

FIG. 2 shows a top view of a set of cut pieces 90-94 of stock generated by system 50, with the system generally arranged as in FIG. 1. Each piece may have a square proximal end 96 (or a beveled proximal end 98 or 100 (shown in phantom)) that was engaged with stop 56, when a distal beveled or square end 102-106 was cut by saw device 54. In other words, the proximal end may be cut before the distal end. Also, for a user, the distal end may be to the right or to the left of the proximal end, when being cut, depending upon whether the stop is disposed to the left (as in FIG. 1) or to the right of the saw device.

Pieces 90-94 may be generated with saw system 50 from longer stock piece 52, with the saw device pivoted to the left, centered (square), and pivoted to the right, respectively (i.e., with the three orientations of blade 78 shown in FIG. 1 from right to left, respectively). As measured from back side 108 of each piece, which was against fence 70 when each piece was cut to length, each of pieces 90-94 has the same length 110 because the saw's pivot axis is not offset (see Section II). Also, the pieces may have the same width 112, which can be entered into computer 64 to allow the computer to calculate an adjustment to the stop position to compensate, if needed, for any difference between (a) the distance from stop 56 to cutting plane 80 and (b) the desired length. For example, beveled proximal end 100 placed against stop 56 would space back side 108 from stop 56 by an added distance that can be calculated using width 112, the bevel angle of end 100 (and/or the pivot angle of the saw), and trigonometry (see Section III).

Further aspects of the saw system, stock, adjustments to the stop position for miter cuts, and methods of using the saw system to process stock are described in the patent documents listed above under Cross-References, which are incorporated herein by reference, particularly U.S. Patent Application Publication No. 2011/0056344 A1, published Mar. 10, 2011.

II. Compensation for an Offset Pivot Axis of a Saw Device of the System

This section describes exemplary configurations of saw system 50 of FIG. 1, with saw device 54 of the system having an aligned or offset pivot axis, and methods of compensating for the offset pivot axis when the saw device is used in the system at various pivot angles to cut stock; see FIGS. 3-13.

Figure 3:
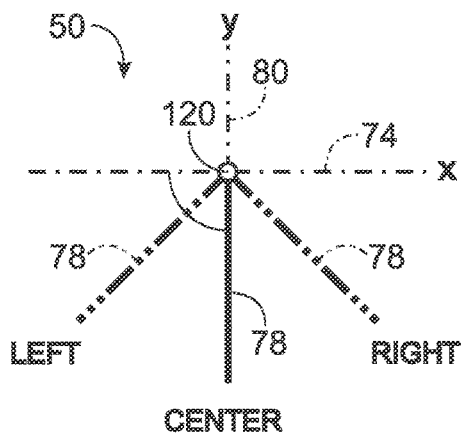
FIG. 3 is a schematic top view of the saw system of FIG. 1, with the pivot axis of the saw device marked by a small circle and having no offset from the square cutting plane or the fence plane of the system, in accordance with aspects of the present disclosure.

FIG. 3 shows a schematic top view of saw system 50. Blade 78 is depicted forward of fence plane 74 (i.e., in a cutting position that would intersect a properly situated piece of stock). The blade is shown in three orientations: a center or square position, with cutting plane 80 orthogonal to positioning axis 62 (see FIG. 1) and fence plane 74, a left position (in phantom outline), with the saw device pivoted 45 degrees to the user's left, and a right position (in phantom outline), with the saw device pivoted 45 degrees to the user's right. To simplify the presentation and subsequent calculations, a substantially horizontal x-axis and a substantially horizontal y-axis defined by fence plane 74 and cutting plane 80, respectively, are shown and used to represent planes 74 and 80. The pivot axis 120 of the saw device, marked by a small circle, is vertical and orthogonal to the circle. Here, pivot axis 120 does not have an offset because the pivot axis is located at the intersection of the x- and y-axes (i.e., coincident with the line formed by the intersection of fence plane 74 and orthogonal cutting plane 80). Since pivot axis 120 is not offset, the saw device can be pivoted in both directions and through a range of angles without changing the length of the piece cut (e.g., see FIG. 2), and without the need for the computer to adjust the stop position to compensate for changes in blade position according to pivot angle.

Figure 4:
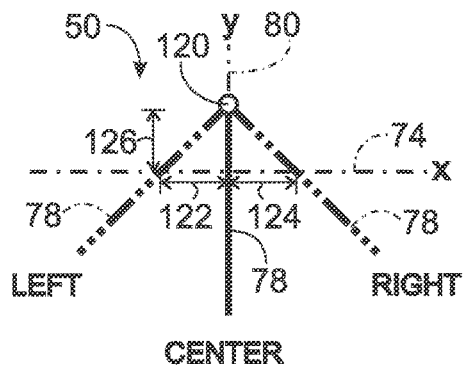
FIG. 4 is another schematic top view of the saw system of FIG. 1, taken generally as in FIG. 3 but with the pivot axis of the saw device offset to a position behind the fence plane of the system, in accordance with aspects of the present disclosure.

FIG. 4 shows another top view of saw system 50, taken generally as in FIG. 3 with pivot axis 120 disposed on the y-axis, but behind the x-axis and fence plane 74. Pieces abutted with the stop and cut with the left, center, and right saw positions, without moving the stop, would be different in length. The left cut would produce a shorter piece with a negative left difference 122 relative to the center cut (i.e., the length for a left cut minus the length for a center cut), and the right cut would produce a longer piece with a negative right difference 124 relative to the center cut (i.e., the length for a center cut minus the length for a right cut). The left and right differences, as defined here, thus would be equal in magnitude and sign.

Figure 5:
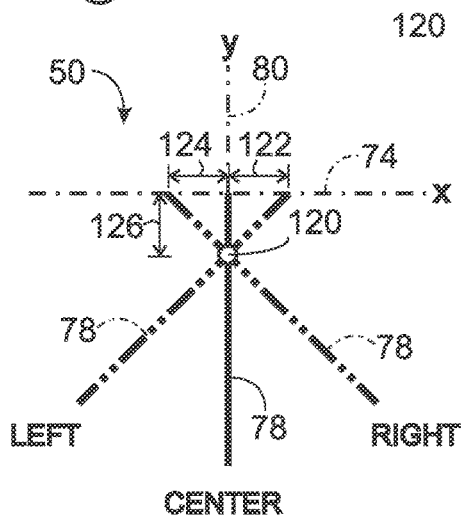
FIG. 5 is yet another schematic top view of the system of FIG. 1, taken generally as in FIG. 3 but with the pivot axis of the saw device offset to a position in front of the fence plane of the system, in accordance with aspects of the present disclosure.

FIG. 5 shows yet another top view of saw system 50, taken generally as in FIG. 3 with pivot axis 120 disposed on the y-axis, but below the x-axis and fence plane 74 in the drawing (i.e., forward of the fence plane during use). As in FIG. 4, pieces cut with the left, center, and right saw positions, without moving the stop, would be different in length. The left cut would produce a longer piece with a positive left difference 122, and the right cut would produce a shorter piece with a positive right difference 124. The left and right differences thus would be equal in magnitude and sign.

Since the left and right cuts were made at 45 degrees in FIGS. 4 and 5, a Y-offset 126 of pivot axis 120 is equal in magnitude to each of the left and right differences. The Y-offset is positive (above the x-axis in the drawing) if the left and right differences are negative, and is negative if the left and right differences are positive.

Figure 6:
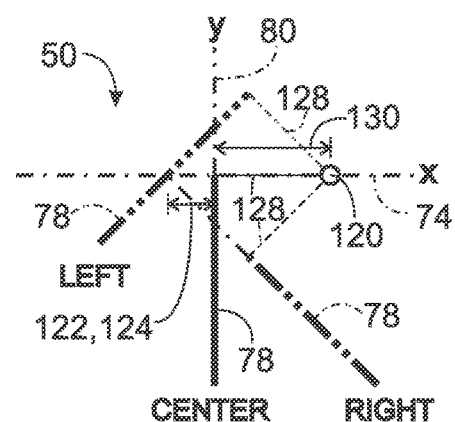
FIG. 6 is still another schematic top view of the system of FIG. 1, taken generally as in FIG. 3 but with the pivot axis of the saw device offset to the right of the square cutting plane of the system, in accordance with aspects of the present disclosure.

FIG. 6 shows still another top view of saw system 50, taken generally as in FIG. 3 but with pivot axis 120 disposed on the x-axis, but to the right of the y-axis and central cutting plane 80. To clarify the geometrical relationship between the saw device and the pivot axis, blade 78 is shown connected to pivot axis 120 by a pivot arm 128.

Pieces cut with the left and right saw positions, without moving the stop, would have the same length, which would be different than the center cut length. In the present example, the left and right cuts each would produce a shorter piece with the same magnitude and opposite sign of left and right differences 122, 124 relative to the center cut. An X-offset 130 corresponding to the length of arm 128 can be calculated from left difference 122 and right difference 124 as described below.

Figure 7:
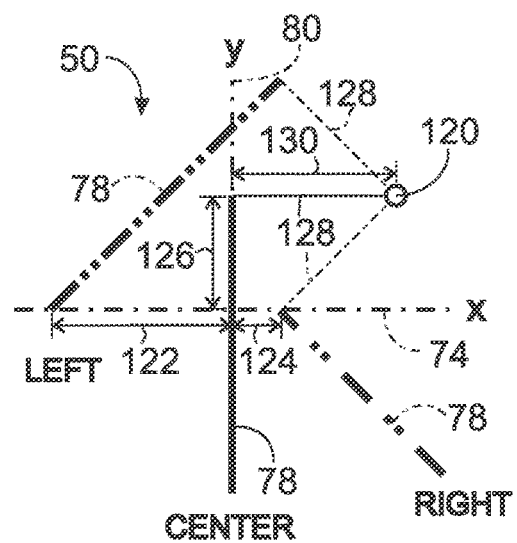
FIG. 7 is still yet another schematic top view of the system of FIG. 1, taken generally as in FIG. 3 but with the pivot axis of the saw device offset from both the square cutting plane and the fence plane of the system, in accordance with aspects of the present disclosure.

FIG. 7 shows still yet another top view of saw system 50, taken generally as in FIG. 3, but with pivot axis 120 offset from both the x- and y-axes (i.e., offset from both fence plane 74 and orthogonal cutting plane 80. In particular, pivot axis 120 is offset from the intersection of the x- and y-axes by X-offset 130 and Y-offset 126. Also, left difference 122 has a different magnitude than right difference 124.

Figure 8:
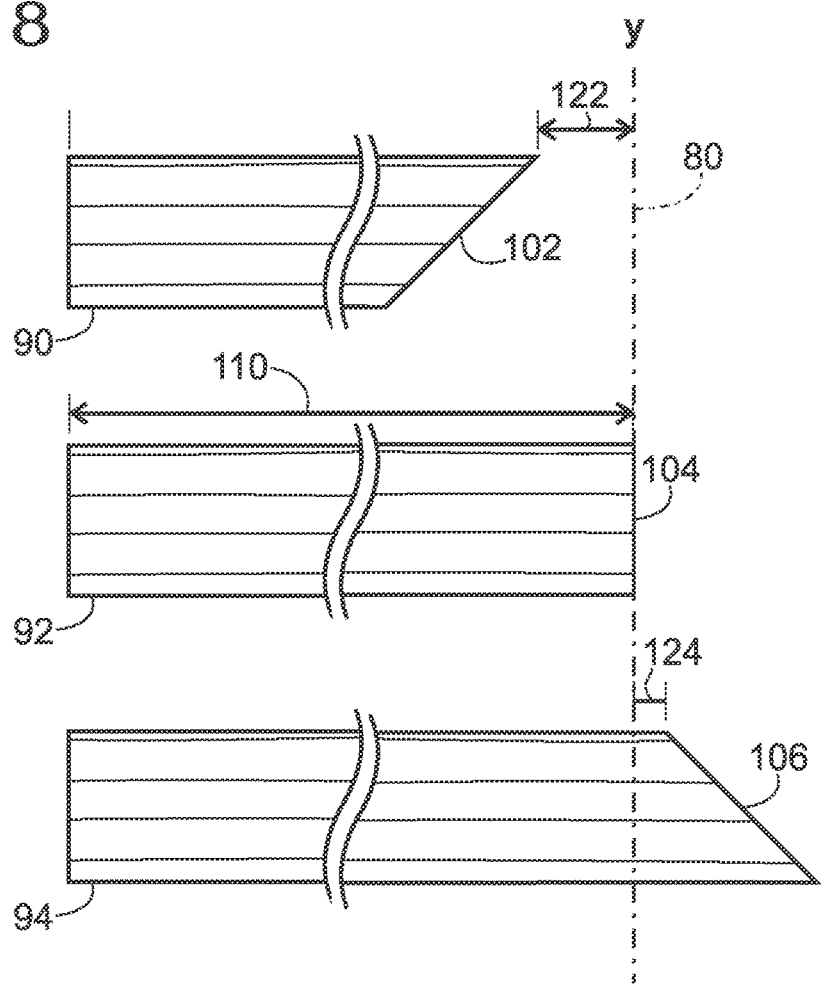
FIG. 8 is a top view of a set of pieces of stock that have been cut using the saw system of FIG. 1, with the saw device having the offset pivot axis of FIG. 7, and with each piece cut while abutted with the stop at the same position, to illustrate how an offset pivot axis can generate cut pieces of different length for different pivot angles of the saw device, in accordance with aspects of the present disclosure.

FIG. 8 shows a top view of pieces 90-94 of FIG. 2, but with the pieces cut using the saw system of FIG. 1 arranged with the offset pivot axis of FIG. 7. Left and right differences 122, 124 are indicated.

Figure 9:
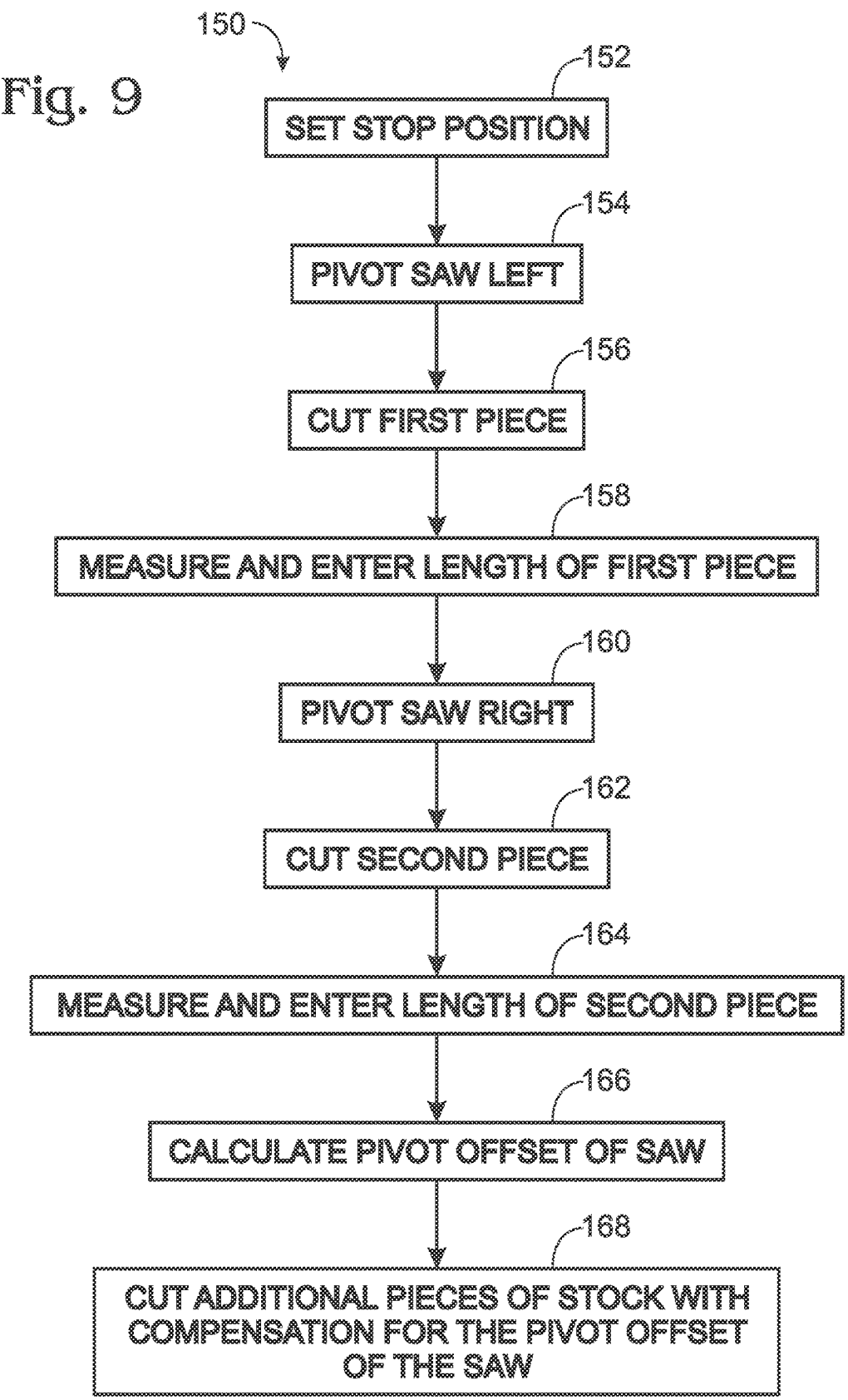
FIG. 9 is a flowchart illustrating exemplary steps for a method of cutting pieces of stock with the saw system of FIG. 1 while compensating for an offset pivot axis of the saw device, in accordance with aspects of the present disclosure.

FIG. 9 is a flowchart 150 illustrating exemplary steps for a method of cutting pieces of stock with the system of FIG. 1, to compensate for an offset pivot axis of the saw device according to the pivot angle of the saw. The steps presented here may be performed in any suitable combination and order, and each step, if performed, may be performed one or more times.

The saw system may be calibrated for square cuts with the saw in its centered position. Calibration generally includes cutting one or more pieces of stock (e.g., to generate a longer piece and a shorter piece), measuring the lengths of the pieces, and entering the lengths into the computer. The computer can then correlate the lengths with the stop position for each length, and determine how to accurately position the stop for other desired lengths. Further aspects of calibrating the saw system are described in the U.S. Patent Application Publication No. 2011/0056344 A1, published Mar. 10, 2011, which is incorporated herein by reference.

The stop position may be set for determining left and right differences 122, 124, indicated at 152. For example, the computer may be instructed and/or allowed to position the stop for pivot point determination. The stop may be moved to a separation distance from the orthogonal cutting plane, such as about 6, 8, 10, or 12 inches, among others. The distance may be relatively short, to minimize the length of stock used. In some cases, a piece of stock may be cut after the stop is positioned and with the saw set to make a square cut, to confirm the accuracy of the center cut length.

The saw may be pivoted to the left, indicated at 154. The saw may be pivoted by any suitable angle from orthogonal to the positioning axis to set the angle of the saw (and saw blade). For example, the saw may be set to an angle of 45 degrees, which simplifies subsequent pivot point calculations, as described further below. In other examples, the computer may be programmed to perform the pivot point calculations based on another predefined angle value for the left and right differences, and/or may be programmed to perform the calculations based on an angle(s) entered by the user.

A first piece of stock may be cut, indicated at 156, with the saw pivoted to the left. The length of the first piece may be measured, and the length entered into the computer, indicated at 158. The length of the first piece allows the computer to calculate left difference 122 (e.g., see FIGS. 4-8).

The saw may be pivoted to the right, indicated at 160, to set the angle of the saw to the right. The saw may be pivoted by any suitable angle from orthogonal to the positioning axis. For example, the saw may be pivoted by the same angle value (e.g., 45 degrees) as for determining left difference 122, but in the opposite pivotal direction.

A second piece of stock may be cut, indicated at 162, with the saw pivoted to the right. The length of the second piece may be measured, and the length entered into the computer, indicated at 164. The length of the second piece allows the computer to calculate right difference 124 (e.g., see FIGS. 4-8). The second piece of stock may be cut before or after the first piece of stock.

A pivot offset of the saw may be calculated, indicated at 166. For example, X-offset 130 and Y-offset 126 may be calculated from left and right differences 122, 124 (e.g., see FIGS. 4-7), as described in more detail below.

Additional pieces of stock may be cut, with the computer controlling the stop position to compensate for the pivot offset of the saw, indicated at 168. For example, the computer may apply an adjustment to the stop position based on the lengths of the first and second pieces, the left and right differences, the calculated pivot offset, and/or the pivot angle (angle value and direction) of the saw for each cut, among others.

Figure 10:
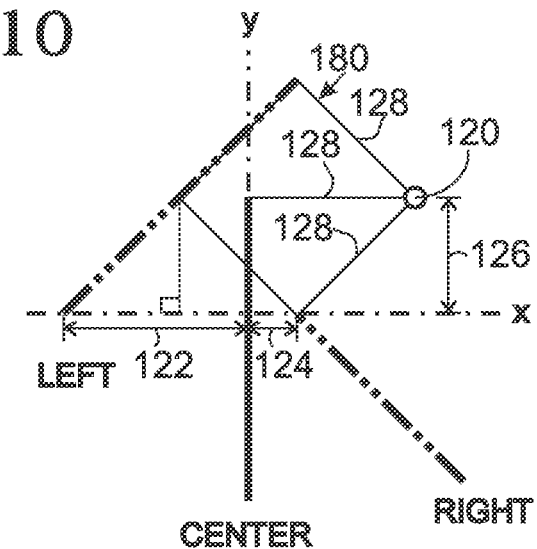
FIG. 10 is a schematic top view of FIG. 7 after revision to illustrate an approach for calculating an offset (a "Y-offset") of the pivot axis from the fence plane of the system, in accordance with aspects of the present disclosure.

FIG. 10 shows a revised version of FIG. 7 to illustrate an approach for determining Y-offset 126. Pivot arm 128 forms a right angle between the left pivot position and the right pivot position, to define a square 180. The length of the square's diagonal is the sum of left difference 122 and right difference 124, and Y-offset 126 is one-half of the length of the diagonal. Accordingly, Y-offset 126 is given by the following formula based on the measured values of left difference 122 and right difference 124:

$$Y \text{ offset} = (\text{left difference} + \text{right difference})/2 \qquad (1)$$

Figure 11:
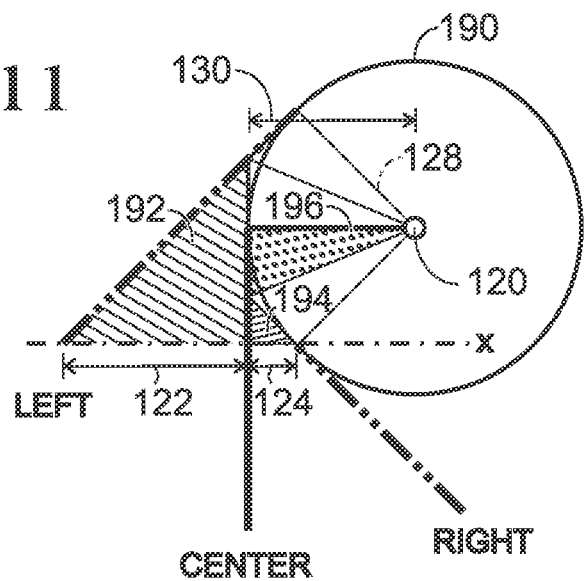
FIG. 11 is a schematic top view of FIG. 7 after revision to illustrate an approach for calculating an offset (an "X-offset") of the pivot axis from the square cutting plane of the system, in accordance with aspects of the present disclosure.

FIG. 11 shows another revised version of FIG. 7 to illustrate an approach for determining X-offset 130. The end of pivot arm 128 defines a circle 190 if the pivot arm travels through a full turn about pivot axis 120. If isosceles right triangles 192, 194 are constructed conceptually with left difference 122 and right difference 124, respectively, the top point of triangle 192 is 22.5 degrees above horizontal, and the top point of triangle 194 is 22.5 degrees below horizontal, with the vertical line between these two points tangent to circle 190. Accordingly, half of the difference between left difference 122 and right difference 124 is the height of a right triangle 196 with a base of X-offset 130 and an interior angle of 22.5 degrees. X-offset 130 is thus given by the following formula:

$$X \text{ offset} = (\text{left difference} - \text{right difference})/(2 * \tan(22.5°)) \qquad (2)$$

Figure 12:
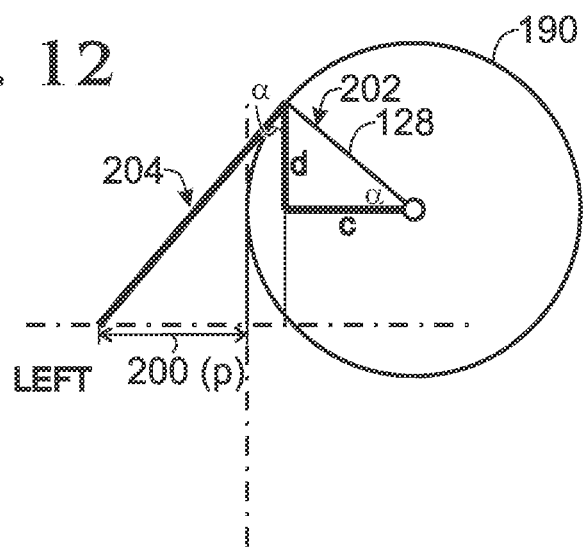
FIG. 12 is a schematic top view of the system of FIG. 1, taken generally as in FIG. 7 but with the saw device pivoted to the left and illustrating a trigonometric approach to calculating an appropriate adjustment to the stop position based on the pivot axis offset and the pivot angle of the saw device, in accordance with aspects of the present disclosure.

FIG. 12 is a schematic top view of system 50, taken generally as in FIG. 7, but with the saw pivoted to the left by an angle α (e.g., 40 degrees to the left in the present illustration). FIG. 12 helps to explain a trigonometric approach to calculating an appropriate pivot compensation or adjustment 200 ("p") for the stop position based on the saw's pivot axis offset and the pivot angle of the saw. A right triangle 202 in the drawing has a base ("c"), a height ("d"), an interior angle ("α"), and a hypotenuse equal in length to arm 128 (and thus X-offset 130). Another right triangle 204 in the drawing has an interior angle of α, and a base and height given as follows:

$$\text{base}(204) = p + X \text{ offset} - c \qquad (3)$$

$$\text{height}(204) = Y \text{ offset} + d \qquad (4)$$

The tangent of triangle 204 is given as follows:

$$\tan(\alpha) = \text{base}(204)/\text{height}(204) \qquad (5)$$

The pivot compensation then can be calculated as follows:

$$c = X \text{ offset} * \cos(\alpha) \qquad (6)$$

$$d = X \text{ offset} * \sin(\alpha) \qquad (7)$$

$$p = ((d + Y \text{ offset}) * \tan(\alpha)) + X \text{ offset} - c \qquad (8)$$

Figure 13:
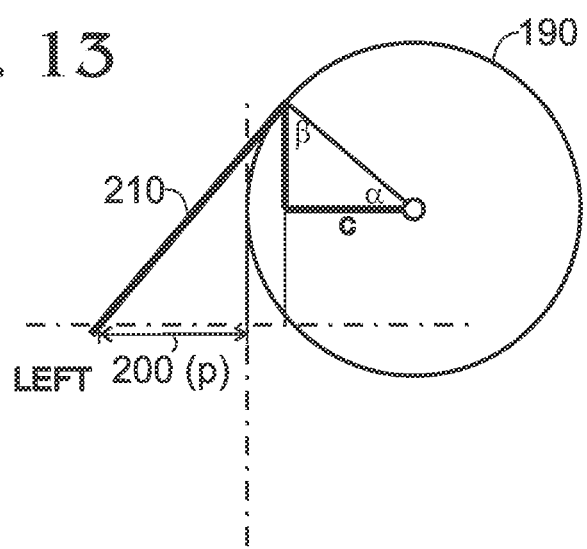
FIG. 13 is a schematic top view of the system of FIG. 1, taken generally as in FIG. 12 and illustrating a different mathematical approach to calculating an appropriate adjustment to the stop position based on the pivot axis offset and the pivot angle of the saw device, in accordance with aspects of the present disclosure.

FIG. 13 is a schematic top view of the system of FIG. 1, taken generally as in FIG. 12 and illustrating a different mathematical approach to calculating an appropriate compensation or adjustment 200 ("p") for the stop position based on the saw's pivot axis offset and the pivot angle of the saw for a given cut to be made. The steps are as follows. (1) Take the equation for circle 190. (2) Take the derivative of this equation, which is the slope of a line 210 tangent to circle 190 and intersecting the x-axis. (3) Find the y-intercept (B), where line 210 has x=0. (4) Solve for p.

The following equations may be utilized:

$$c = X \text{ offset} * \cos(90 + \beta) \qquad (9)$$

$$\text{slope, } m = -c \Big/ \sqrt{X \text{offset}^2 - c^2} \qquad (10)$$

$$y = X \text{ offset} * \sin(90 + \beta) \qquad (11)$$

$$x = X \text{ offset} * \cos(90 + \beta) \qquad (12)$$

$$B = X \text{ offset} * \sin(90 + \beta) - m * X \text{ offset} * \cos(90 + \beta) \qquad (13)$$

$$Y \text{ offset} = m * x + \beta \qquad (14)$$

$$p = X \text{ offset} - \left(\frac{Y \text{ offset} + B}{m}\right) \qquad (15)$$

III. Exemplary Methods of Utilizing the Saw System to Create Miter Joints

This section describes exemplary methods that use saw system 50 to cut pieces of stock (such as molding) for installation in a mated configuration to create miter joints; see FIGS. 14-30.

Figure 14:
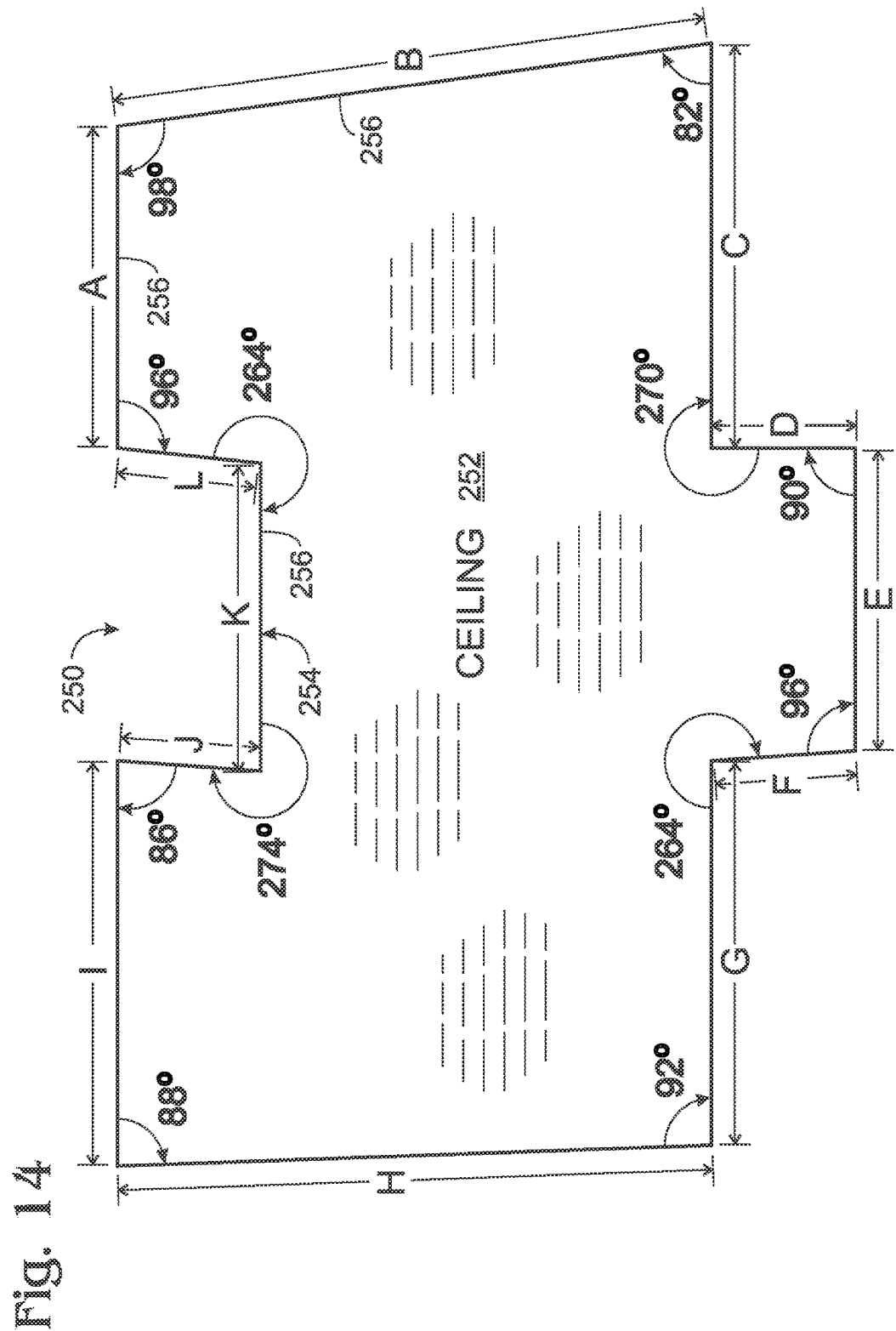
FIG. 14 is an upward view taken inside a room toward a ceiling thereof before installation of crown molding at the perimeter of the ceiling, in accordance with aspects of the present disclosure.

FIG. 14 shows an upward view of an enclosed area of a building, such as a room 250, taken from inside the room toward a ceiling 252 thereof, before installation of molding with the aid of saw system 50. The enclosed area may be disposed in any suitable building and may have a wall structure 254 formed by one or more connected walls 256. The walls may be vertical or may have any other suitable orientation. In any event the wall structure may at least partially or completely encircle ceiling 252 and a floor opposite the ceiling. Molding may be installed adjacent (e.g., against) the wall structure at any suitable position, such as adjacent (e.g., against) ceiling 252 (with crown molding), adjacent the floor (with base molding), and/or intermediate the floor and ceiling. In other examples, the wall structure may be provided by the exterior of a building or the interior or exterior of another structure or article (e.g., an article of furniture, a cabinet, shelves, drawers, a deck, stairs, a door, a window, etc.).

The wall structure may create a plurality of corners where adjacent walls 256 meet one another. The corners may include inside (concave) corners and outside (convex) corners. Each corner forms a corner angle (interchangeably termed a wall angle), which may or may not be approximately a right angle. The angle of each corner may be measured with an angle finder, which may measure and provide an angle through air for each corner, as shown here, or an angle less than 180 degrees for both inside and outside corners. In the present example, many of the corners are formed by walls that are not square to one another, to produce angles of inside corners that are not exactly 90 degrees and angles of outside corners that are not exactly 270 degrees. Accordingly, the angle at which molding is cut for each corner should be based on a measured value for the particular angle of the corner, to provide a custom fit. This process can be laborious and error-prone without the benefit of saw system 50.

Each wall can be measured horizontally (e.g., near the ceiling or floor), to determine a desired length for each piece of molding. For example, in the present illustration, each wall has a dimension, labeled serially as A to L and measured between flanking corners parallel to ceiling 252 (or the floor, among others). The dimension corresponds to the desired length for a piece of molding to be attached to each wall. In some cases, a user of system 50 can measure and record all of the wall dimensions (e.g., A to L) and corner angles of a room (or other wall structure) before cutting and installing any of the molding (or other pieces of stock), or may measure a wall dimension and a corner angle after cutting and installing each piece of stock and before cutting and installing the next piece of stock.

Figure 15:
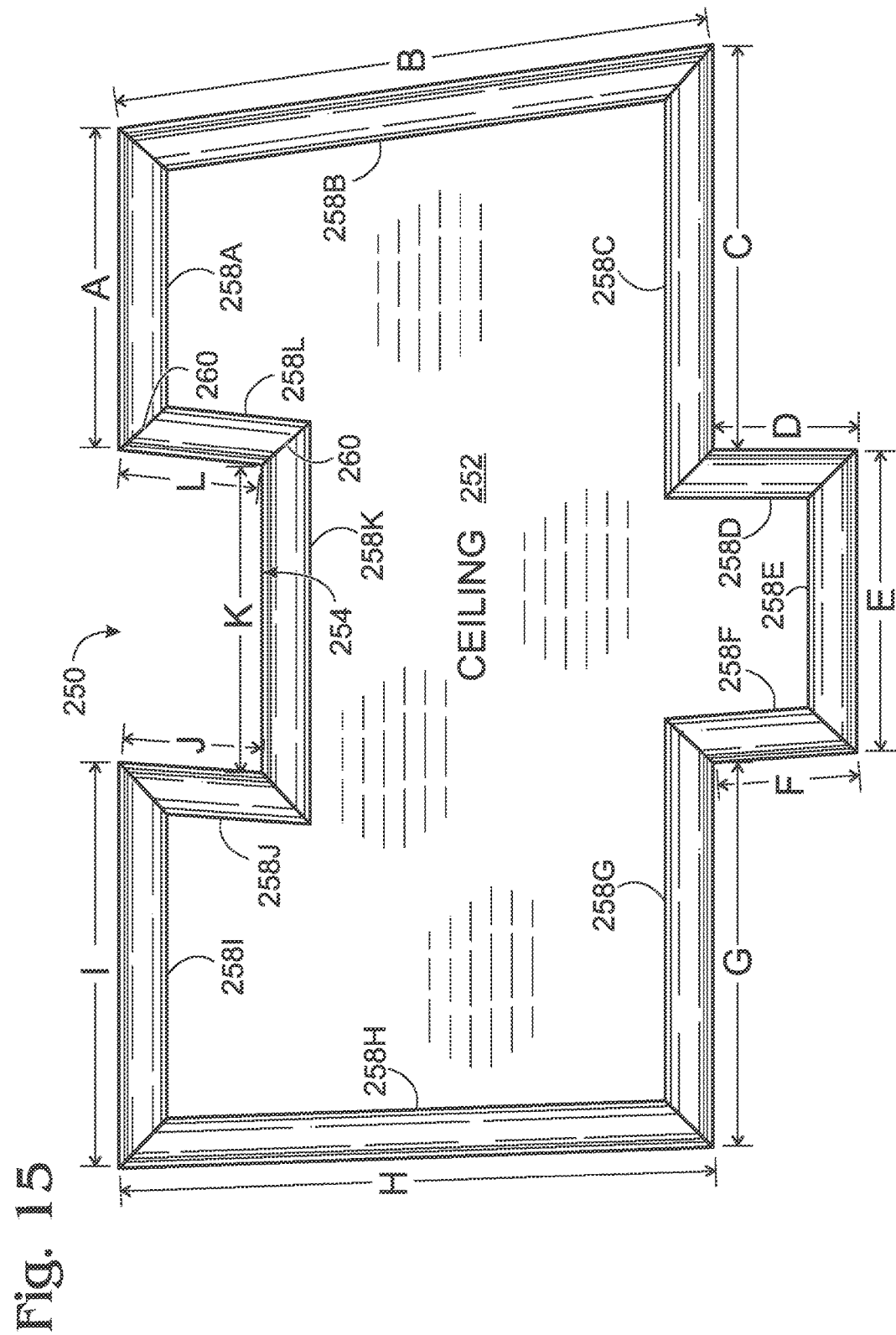
FIG. 15 is an upward view of the room of FIG. 14, taken as in FIG. 14 after installation of crown molding at the perimeter of the ceiling, in accordance with aspects of the present disclosure.

FIG. 15 show an upward view of room 250 taken after installation of pieces 258A to 258L of crown molding around wall structure 254 of room 250 adjacent ceiling 252. The pieces may be cut and installed on the walls of wall structure 254 to form miter joints 260 at which opposed ends of adjacent pieces are mated (i.e., arranged end-to-end and fitted together in close proximity and/or abutted). The pieces may be cut and/or installed in sequence, starting with a piece of molding for one of the walls (e.g., piece 258A) and then working around the room in a counterclockwise or clockwise direction (e.g., piece 258B next, then piece 258C, and so on, until piece 258L completes the circuit of molding around the room). In other cases, the molding may be installed around a wall structure without forming a complete circuit.

Figure 16:
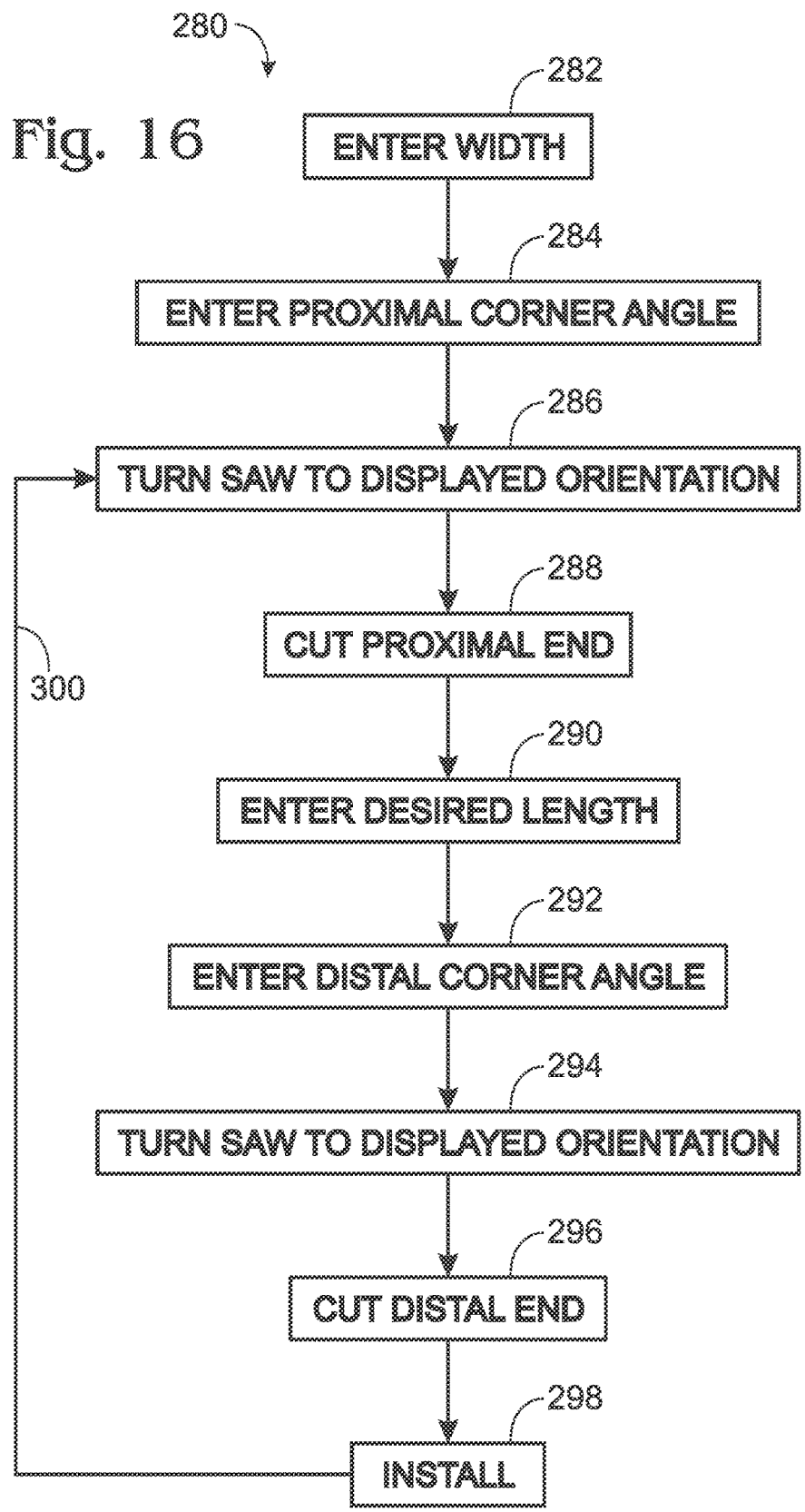
FIG. 16 is a flowchart presenting exemplary steps for a method of cutting and installing a series of stock pieces arranged end-to-end around a wall structure to form miter joints, in accordance with aspects of the present disclosure.

FIG. 16 shows a flowchart 280 presenting exemplary steps for a method of cutting and installing a series of stock pieces configured to be mated at miter joints around a wall structure, such as wall structure 254 of FIGS. 14 and 15. The steps of the method may be performed in any suitable order and combination, and may be combined with or modified by any suitable steps, features, or aspects of the present disclosure.

A width of stock pieces to be used may be entered, indicated at 282. The width, and any of the measured angles or lengths described below, may be entered into computer 64 of system 50, such as via input interface 66 (see FIG. 1).

A value for a proximal corner angle of the wall structure may be entered, indicated at 284. The proximal corner forming the proximal corner angle may be a site where a proximal end of a first piece of stock will be fixed, as a result of attaching the first piece to the wall structure. The proximal corner angle may be measured by any suitable instrument, such as a digital or analog angle finder. The value entered may, for example, be less than or greater than 180 degrees, and may or may not be equal to 90 degrees. Whether the proximal corner angle is an inside corner or an outside corner also may be entered into the computer.

The computer may be programmed and/or allowed to calculate an orientation for the saw to cut a proximal end of the first piece of stock based on the proximal corner angle entered. The orientation may include an appropriate pivot angle (i.e., a single angle or a compound angle) for setting the saw, namely, at least one pivot angle value and at least one pivot direction (e.g., left or right, or clockwise or counterclockwise, among others). For example, if the proximal corner is an inside corner and the stock will be cut vertically, the computer may obtain an appropriate orientation for the saw by dividing the entered proximal corner angle by two and then subtracting the result from 90, and selecting right as a pivot direction. (This calculation assumes that the miter saw gauge is set at zero degrees for a square cut and that the saw is arranged to the right of the stop.) In another example, if the proximal corner is an outside corner and the entered value is less than 180 degrees, the computer may obtain an appropriate orientation for the saw by dividing the entered proximal corner angle by two, subtracting the result from 90, and selecting left as a pivot direction. If the proximal corner is an outside corner and the entered value is greater than 180 degrees, in addition to selecting left as a pivot direction, the computer may obtain an appropriate orientation for the saw by selecting left as a pivot direction and dividing by two and then subtracting 90, subtracting 180 and then dividing by two, or the like.

The saw may be set to the calculated orientation, indicated at 286. The orientation calculated by the computer may be outputted and/or communicated to the user visually and/or audibly. For example, the orientation may be displayed, printed, spoken, or the like. In any event, the user may turn the saw to the orientation calculated and outputted by the computer.

A proximal end of the first piece of stock may be cut, indicated at 288, after setting the saw to the orientation calculated from the proximal corner angle. When the proximal end is cut, the first piece of stock generally is not in contact with the stop of the saw system. Accordingly, the computer may not need to calculate an appropriate stop position for cutting the proximal end.

A desired length of the first piece of stock may be entered, indicated at 290. The desired length may be a desired final length after both ends of the piece of stock have been cut by the saw system. For example, the desired length may be entered by pressing keys or as data communicated to computer 64 from a measuring device operated by the user. In any event, the length may be measured from the proximal corner to an adjacent distal corner where a distal end of the piece will be fixed, as a result of attaching the piece to the wall structure.

A value for a distal corner angle also may be entered, indicated at 292. The distal corner for which the value is entered may be a site where the distal end of the first piece of stock will be fixed, as a result of attaching the piece to the wall structure. Whether the distal corner angle is an inside corner or an outside corner also may be entered.

The computer may be programmed and/or allowed to calculate an orientation for the saw to cut the distal end of the piece of stock based on the distal corner angle value entered. The orientation may include an appropriate pivot angle for setting the saw, namely, at least one pivot angle value and direction (e.g., left or right, or clockwise or counterclockwise, among others). For example, if the distal corner is an inside corner and the stock will be cut vertically, the computer may obtain an appropriate orientation for the saw by dividing the entered distal corner angle value by two and subtracting the result from 90, and selecting left as a pivot direction. In another example, if the distal corner is an outside corner and the entered value is less than 180 degrees, the computer may obtain an appropriate orientation for the saw by dividing the entered distal corner angle value by two and selecting right as a pivot direction. If the distal corner is an outside corner and the entered value is greater than 180 degrees, in addition to selecting right as a pivot direction, the computer may obtain an appropriate orientation for the saw by dividing the angle value by two and then subtracting a value of 90, subtracting a value of 180 and then dividing by two, or the like.

The saw may be set to the calculated orientation, indicated at 294. The orientation may be outputted and/or communicated as described above.

The computer may be programmed to control movement of stop 56 to an appropriate position for cutting the desired length. In some cases, the computer may apply one or more adjustments to determine the appropriate position of the stop for cutting the desired length. These adjustments may compensate for a pivot axis offset (if any) of the saw, by calculating and compensating for the consequence of this offset on cutting plane position at the fence plane for the particular saw orientation to be used for cutting the distal end (e.g., see FIGS. 3-13). These adjustments also or alternatively may compensate for a gap between the back edge of the piece and the stop, at the beveled proximal end of the piece. Compensation for the gap can be calculated from the width of the stock and the orientation of the saw when the proximal end was cut, as described further below.

The distal end of the first piece may be cut, indicated at 296, with the saw set to the calculated orientation, the stop disposed in the appropriate position, and the proximal end of the first piece engaged with the stop.

The double-cut first piece may be installed, indicated at 298. Installation generally involves attaching the piece to the wall structure. The piece may be installed such that the proximal end of the first piece is fixed at the proximal corner and the distal end of the first piece is fixed at the distal corner.

Steps 286 to 298 next may be repeated for a second piece of stock, indicated at 300. The computer may determine an appropriate orientation for the saw to cut the proximal end of the second piece based on the distal corner angle entered for the first piece of stock. For example, the computer may select and communicate the same pivot angle value calculated for cutting the distal end of the first piece, and an opposite pivot direction from that used for cutting the distal end of the first piece. The second piece of stock, when cut to the desired length, may be installed end-to-end with the first piece of stock, to form a miter joint, with the distal end of the first piece abutted with the proximal end of the second piece. Any of steps 286 to 298 may be performed for the second piece of stock after the first piece of stock is cut and/or and after the first piece of stock is installed.

Steps 286 to 298 further may be repeated for additional pieces of stock, indicated at 300. The computer may determine an appropriate pivot angle for cutting the proximal end of each successive piece of stock based on distal corner angle information entered for the immediately-preceding piece, as described above for the second piece of stock. Each additional piece of stock may be cut at both ends and then installed with its proximal end adjacent the distal end of the immediately-preceding piece of stock, to create another miter joint.

FIGS. 17-26 depict exemplary configurations produced before, during, and after performance of an exemplary embodiment of the method of FIG. 16 to install a contiguous series of three crown molding pieces in an oddly-shaped, small alcove of a room 308.

Figure 17:
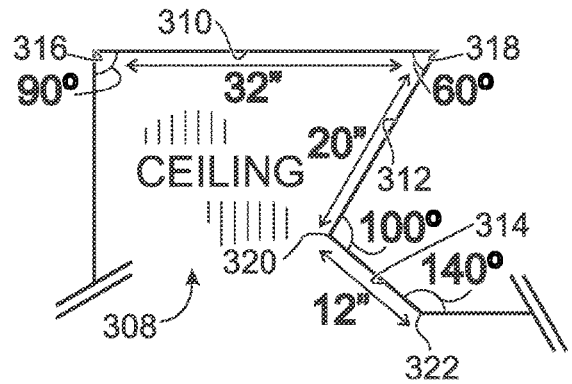
FIG. 17 is a fragmentary upward view of a room toward a ceiling thereof before installation of crown molding at the perimeter of the ceiling, in accordance with aspects of the present disclosure.

FIG. 17 shows a fragmentary upward view of room 308 before installation of crown molding at the perimeter of the ceiling, against walls 310-314, and between corners 316-322.

Figure 18:
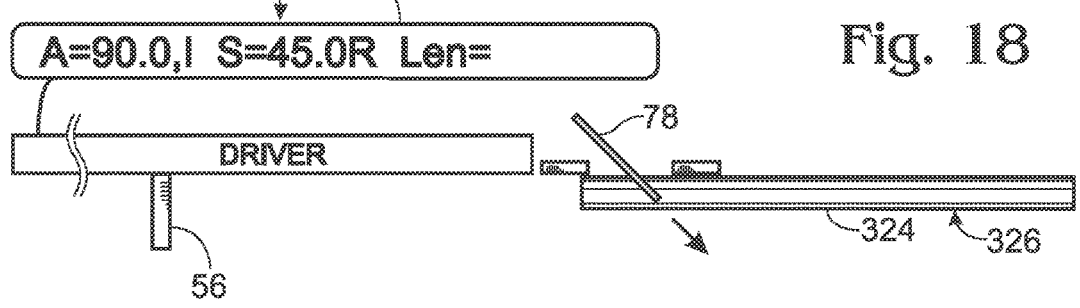
FIG. 18 is a top view of selected aspects of the saw system of FIG. 1 taken during performance of the method of FIG. 16 to install crown molding in the room of FIG. 17, with the saw system cutting a proximal end of a first piece of crown molding, in accordance with aspects of the present disclosure.

FIG. 18 shows a top view of selected aspects of saw system 50 (see FIG. 1), with saw blade 78 cutting a proximal end of a first piece 324 of crown molding 326. A user has entered an angle value ("90") and an inside corner designation ("I") for proximal corner 316 (see FIG. 17). Display 68 of computer 64 presents this information back to the user ("A=90.0,I"), to allow the user to verify that the entry is correct. The computer also has calculated an appropriate orientation for the saw, namely, 45 degrees with the saw pivoted to the right ("R"), which is displayed to the user ("S=45.0R"). The desired length ("Len") of the piece may or may not have been entered already at this point, and may or may not be displayed. Here, no value is displayed yet for the length. The user has turned the saw to the indicated setting and is in the process of cutting the proximal end of first piece 324. Stop 56 is spaced from the first piece.

Figure 19:
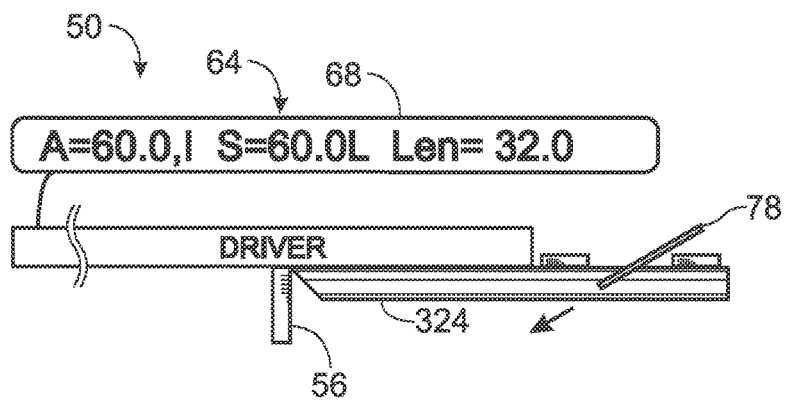
FIG. 19 is a top view taken as in FIG. 18, but with the saw system cutting a distal end of the first piece of crown molding, in accordance with aspects of the present disclosure.

FIG. 19 shows saw system 50 cutting a distal end of first piece 324. The user has entered an angle value ("60") and an inside corner designation ("I") for distal corner 318 where the distal end of the first piece will be fixed (see FIG. 17), which is displayed to the user ("A=60.0,I"). The computer also has calculated an appropriate orientation for the saw, namely, 60 degrees with the saw pivoted to the left ("L"), which is displayed to the user ("S=60.0L"). The user has turned the saw to the displayed orientation. The user also has entered a desired length value (32 inches) for the first piece, which is the distance measured by the user from corner 316 to corner 318 (see FIG. 17). The length value is displayed back to the user ("Len=32.0"). Computer 64 has calculated an appropriate position for stop 56 based on the entered length value (no miter adjustment to the stop position is needed in this case), and has controlled movement of the stop to that position. The cut proximal end of the first piece has been placed against stop 56, and the user is in the process of cutting the distal end of the first piece.

Figure 20:
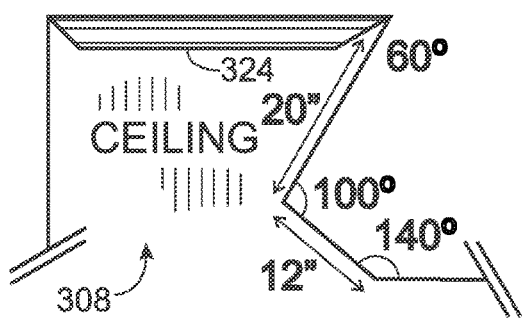
FIG. 20 is a fragmentary upward view of the room of FIG. 17 taken after installation of the first piece of crown molding, in accordance with aspects of the present disclosure.

FIG. 20 shows room 308 after installation of double-cut first piece 324 of crown molding. The proximal end of the piece is fixed in proximal corner 316, and the distal end of the piece is fixed in distal corner 318 (also see FIG. 17).

Figure 21:
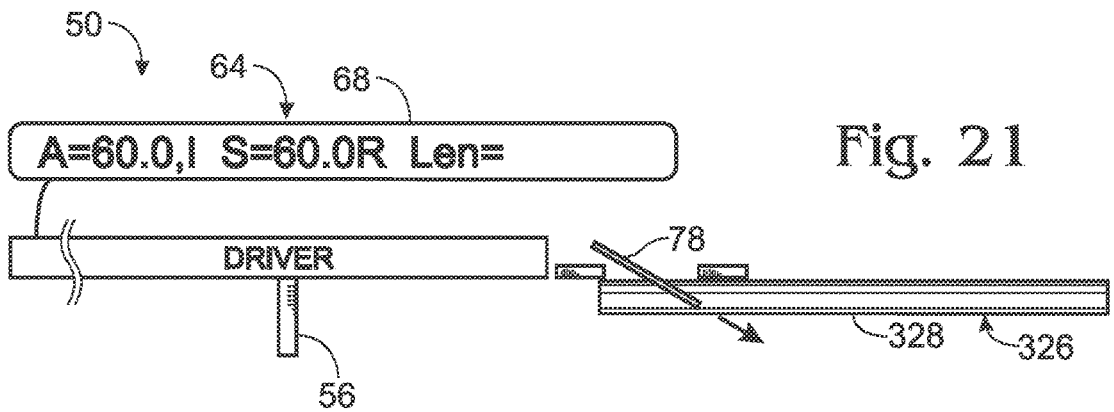
FIG. 21 is a top view taken as in FIG. 18, but with the saw system cutting a proximal end of a second piece of crown molding for the room of FIG. 17, in accordance with aspects of the present disclosure.

FIG. 21 shows a top view of selected aspects of saw system 50 with saw blade 78 cutting a proximal end of a second piece 328 of crown molding 326. The second piece may be cut from a virgin length of stock, as shown here, or from a remaining length of stock resulting from one or more previous cuts (e.g., a remaining portion of a stock piece left after cutting off first piece 324). Computer 64 displays (as "A=60.0I") the angle value ("60.0") and inside corner designation ("I") entered previously by the user as the distal corner 318 where the distal end of first piece 324 will be (or already was) fixed. (Corner 318 is considered the proximal corner for second piece 328.) The computer also has determined an appropriate orientation for the saw to cut the proximal end of the second piece, based on distal corner information entered previously by the user for the first piece. The orientation is 60 degrees (the same value calculated for the distal end of the first piece), but with the saw pivoted in the opposite direction, to the right ("R"), which is displayed to the user (as "S=60.0R"). The user has turned the saw to the indicated setting and is in the process of cutting the proximal end of second piece 328, with stop 56 not in contact with the second piece.

Figure 22:
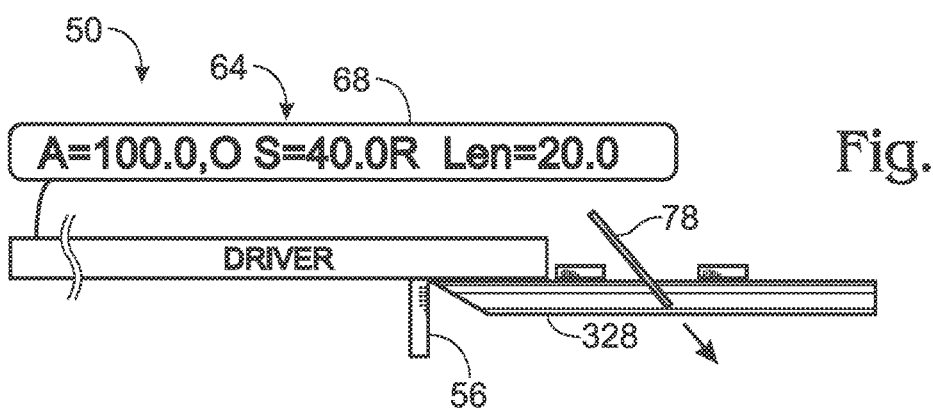
FIG. 22 is a top view taken as in FIG. 21, but with the saw system cutting a distal end of the second piece of crown molding, in accordance with aspects of the present disclosure.

FIG. 22 shows saw system 50 cutting a distal end of second piece 328. The user has entered a measured angle value ("100") and an outside corner designation ("O") for distal corner 320 where the distal end of the second piece will be fixed (also see FIG. 17), which is displayed to the user ("A=100.0,O"). The computer also has calculated an appropriate orientation for the saw, namely, 40 degrees with the saw pivoted to the right ("R"), which is displayed to the user ("S=40.0R"). The user has turned the saw to the displayed orientation. The user also has entered a desired length value (20 inches) for the second piece, which is the distance measured by the user from corner 318 to corner 320 (see FIG. 17). The entered length value is displayed back to the user ("Len=20.0"). Computer 64 has calculated an appropriate position for stop 56 based on the entered length value (no miter adjustment to the stop position is needed in this case), and has controlled movement of the stop to that position. The proximal end of the second piece has been placed against stop 56, and the user is in the process of cutting the distal end of the second piece.

Figure 23:
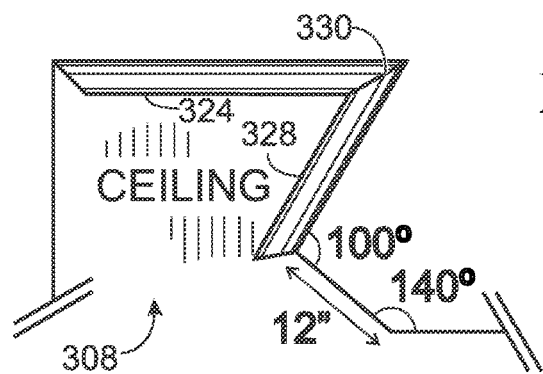
FIG. 23 is a fragmentary upward view of the room of FIG. 20 taken after installation of the second piece of crown molding, in accordance with aspects of the present disclosure.

FIG. 23 shows room 308 after installation of double-cut second piece 328 end-to-end with previously installed first piece 324, to form a miter joint 330. The proximal end of the second piece is fixed in corner 318, and the distal end of the piece is fixed in corner 320 (also see FIG. 17).

Figure 24:
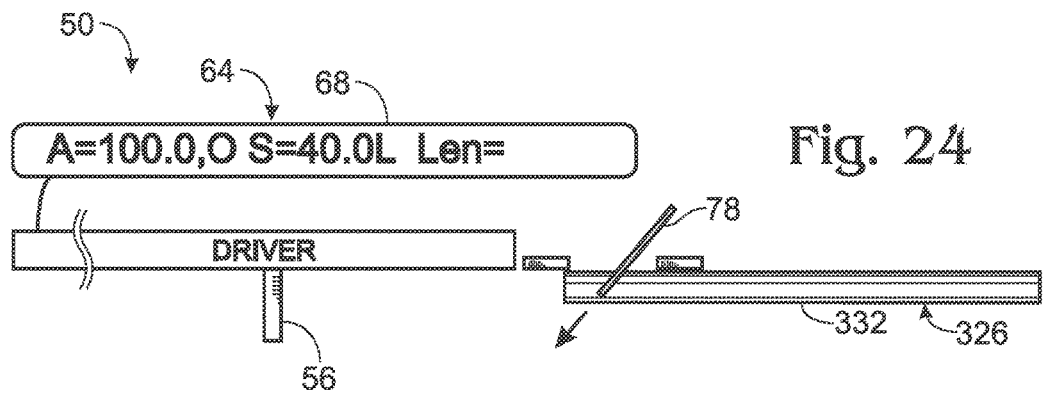
FIG. 24 is a top view taken as in FIG. 18, but with the saw system cutting a proximal end of a third piece of crown molding for the room of FIG. 17, in accordance with aspects of the present disclosure.

FIG. 24 shows a top view of selected aspects of saw system 50 with saw blade 78 cutting a proximal end of a third piece 332 of crown molding 326. The third piece may be cut from a virgin length of stock, as shown here, or from a remaining length of stock resulting from one or more previous cuts (e.g., a remaining portion of a stock piece left after cutting off first piece 324 and/or second piece 328). Computer 64 displays (as "A=100.0,O") the angle value ("100.0") and outside corner designation ("O") entered previously by the user as the distal corner 320 where the distal end of second piece 328 will be (or already was) fixed. (Corner 320 is considered the proximal corner for third piece 332.) The computer also has determined an appropriate orientation for the saw to cut the proximal end of the third piece, based on the distal corner angle information entered previously by the user for the second piece. The orientation is 40 degrees (the same value calculated for the distal end of the second piece), but with the saw pivoted in the opposite direction, namely, to the left ("L"), which is displayed to the user ("S=40.0L"). The user has turned the saw to the indicated setting and is in the process of cutting the proximal end of third piece 332, with stop 56 not in contact with the third piece.

Figure 25:
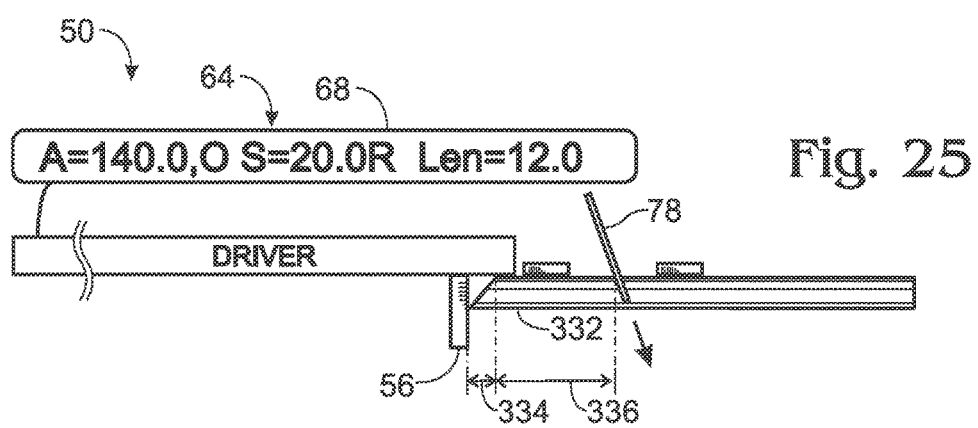
FIG. 25 is a top view taken as in FIG. 24, but with the saw system cutting a distal end of the third piece of crown molding, in accordance with aspects of the present disclosure.

FIG. 25 shows saw system 50 cutting a distal end of third piece 332. The user has entered a measured angle value ("140") and an outside corner designation ("O") for distal corner 322 where the distal end of the third piece will be fixed (also see FIG. 17), which is displayed to the user ("A=140.0,O"). The computer also has calculated an appropriate orientation for the saw, namely, 20 degrees with the saw pivoted to the right ("R"), which is displayed to the user (as "S=20.0R"). The user has turned the saw to the displayed orientation. The user also has entered a desired length value for the third piece (12 inches), which is the distance measured by the user from corner 320 to corner 322 (see FIG. 17). The entered length value is displayed back to the user ("Len=12.0"). Computer 64 has calculated an appropriate position for stop 56 based on the entered length value, and has controlled movement of the stop to that position. In this case, the appropriate stop position includes a miter compensation 334 that positions stop 56 at a greater distance from saw blade 78 than the desired (measured) length 336. More particularly, desired length 336 is determined here by the back edge of third piece 332 (adjacent the fence), which is spaced from stop 56 by the length of the beveled region of the proximal end of third piece 332 (i.e., by miter compensation 334). More generally, an appropriate miter offset to be added to (or, in some cases, subtracted from) the desired length for determining an appropriate stop position can be calculated as follows from the saw angle for the proximal end cut and the width of the stock:

$$\text{miter offset} = \text{width} * \tan(\text{saw angle}) \quad (15)$$

In any event, the proximal end of the third piece has been placed against stop 56, and the user is in the process of cutting the distal end of the third piece. Further aspects of calculating and applying a miter compensation to the stop position are disclosed in U.S. Patent Application Publication No. 2011/0056344 A1, published Mar. 10, 2011, which is incorporated herein by reference.

Figure 26:
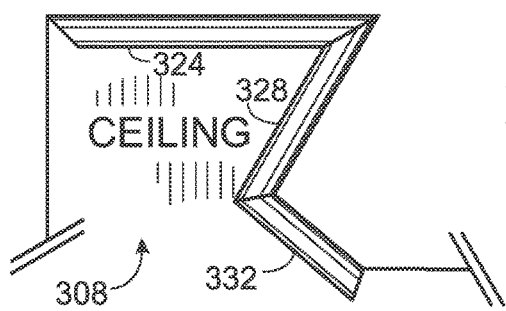
FIG. 26 is a fragmentary upward view of the room of FIG. 23 taken after installation of the third piece of crown molding, in accordance with aspects of the present disclosure.

FIG. 26 shows room 308 after installation of double-cut third piece 332 end-to-end with previously installed second piece 328, to form another miter joint. The proximal end of the third piece is fixed in corner 320, and the distal end of the piece is fixed in corner 322 (also see FIG. 17). Additional pieces of crown molding can be cut and installed to form additional miter joints. In some cases, additional pieces are cut and installed until the last piece forms a miter joint with the initial piece, and the crown molding forms a complete circuit around the room. In some cases, the crown molding does not form a complete circuit. In some cases, base molding is installed adjacent the floor. In some cases, the pieces of stock are installed on a different type of wall structure and/or the stock is not crown molding.

Figure 27:
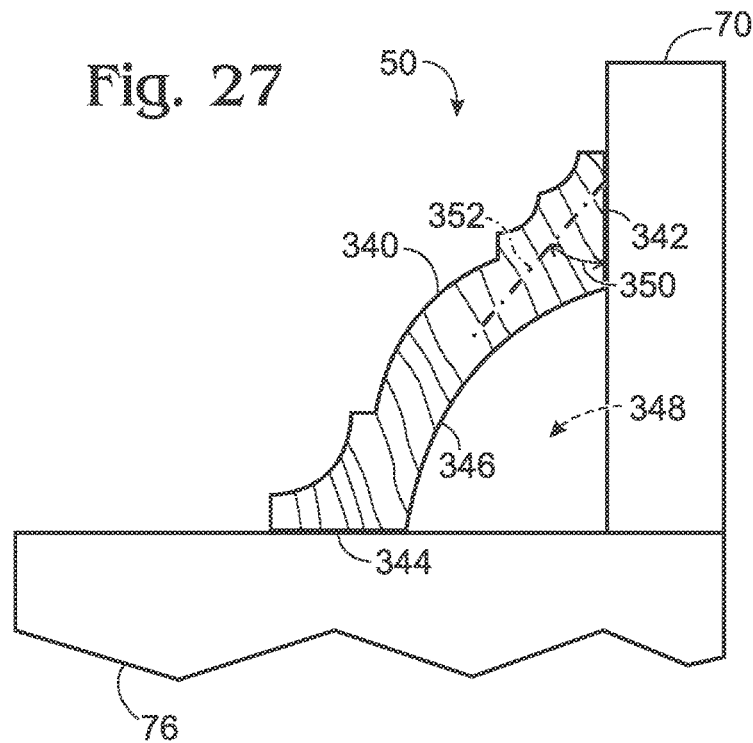
FIG. 27 is an end view of a piece of crown molding supported by the system of FIG. 1 for a vertical cut through the piece, in accordance with aspects of the present disclosure.

FIG. 27 shows an end view of a stock piece 340 of crown molding supported by system 50 for a vertical cut. In particular, piece 340 is supported upside down relative to its prospective mounted orientation on a wall and ceiling. The crown molding may have a wall-engagement surface region 342, which is abutted with fence 70 (corresponding to the wall), and a ceiling-engagement surface region 344 arranged orthogonally to surface region 342 and abutted with base 76 (corresponding to the ceiling). Surface regions 342 and 344 may be separated from one another by an inner surface region 346 that does not contact the wall or ceiling when the crown molding is mounted operatively to cover the seam between the wall and ceiling. Accordingly, the crown molding shown here, when mounted, forms a hollow space 348 bounded by inner surface region 346 and areas of the wall and ceiling disposed generally between surface regions 342 and 344. Also, the crown molding is configured to form a spring angle 350 between the wall and a plane 352 defined by the crown molding.

Crown molding can be cut in the inverted configuration shown in FIG. 27, with the saw blade vertical, to create pieces suitable for forming miter joints at inside and outside corners of a wall structure. The saw can be pivotable about a vertical pivot axis only, to orient the saw blade appropriately for cutting each beveled end at a selectable angle.

Figure 28:
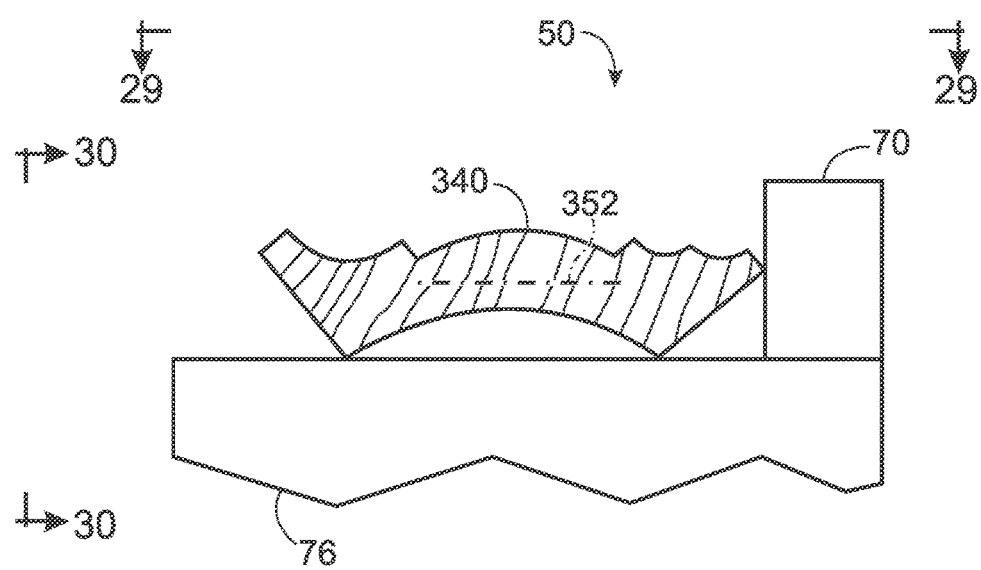
FIG. 28 is an end view of the piece of crown molding of FIG. 27 supported by the system of FIG. 1 for an inclined cut through the piece of compound molding at a compound angle, in accordance with aspects of the present disclosure.

FIG. 28 shows an end view of the piece of crown molding of FIG. 27 supported by system 50 with the piece in a different orientation, namely, with the piece lying flat on base 76. The inverted configuration of FIG. 27, with the crown molding supported at spring angle 350, may not be suitable in some cases, such as when the crown molding is too wide to be supported reliably at the spring angle by system 50. In any event, system 50 can be utilized to cut pieces of crown molding with the pieces lying flat, as shown in FIG. 28. To achieve the proper cutting angle and beveled end, the blade of a compound miter saw is oriented for an inclined cut through the stock piece at a compound angle, by pivoting the saw about a horizontal axis and about a vertical axis.

FIGS. 29 and 30 show top and side views of piece 340 being cut with the piece lying flat as in FIG. 28. The piece can be cut as described above (e.g., see FIGS. 18 and 19) according to the measured corner angle of a wall structure, to provide a cut proximal end or distal end for a miter joint. Computer 64 can be programmed to calculate vertical and horizontal angle components for pivoting the saw to achieve the compound angle. The horizontal angle component or swivel angle 354 (interchangeably termed a miter angle) describes pivoting the saw about a vertical pivot axis. The vertical angle component or tilt angle 356 (interchangeably termed a bevel angle) describes pivoting the saw about a horizontal pivot axis. Appropriate swivel and tilt angles for cutting piece 340 can be calculated based on the spring angle of the crown molding and the measured corner angle, as follows:

$$\text{swivel angle} = \arctan\left(\frac{\sin(\text{spring angle})}{\tan(\text{corner angle}/2)}\right) \quad (16)$$

$$\text{tilt angle} = \arcsin(\cos(\text{spring angle}) * \cos(\text{corner angle}/2)) \quad (17)$$

Method 280 of FIG. 16 can be utilized with compound angles, too. For example, the swivel angle and tilt angle for cutting the proximal end of a second piece of stock can be determined based on the entered distal corner angle where a distal end of a first piece of stock will be (or already is) fixed.

The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. The subject matter of the inventions includes all novel and nonobvious combinations and subcombinations of the various elements, features, functions, and/or properties disclosed herein. The following claims particularly point out certain combinations and subcombinations regarded as novel and nonobvious. Inventions embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the inventions of the present disclosure. Further, ordinal indicators, such as first, second, or third, for identified elements are used to distinguish between the elements, and do not indicate a particular position or order of such elements, unless otherwise specifically stated.

We claim:

1. A method of cutting and installing pieces of stock around a wall structure, the method comprising:
   providing a system including
      a saw device capable of pivoting about a pivot axis to cut pieces of stock at various selectable angles of a cutting plane of the saw device relative to a positioning path,
      a stop,
      a fence defining a fence plane that is vertical and parallel to the positioning path, wherein the cutting plane and the fence plane intersect one another to define a line when the saw device is oriented to make a square cut,
      a driver capable of moving the stop along the positioning path through a range of distances from the saw device, and
      a computer programmed to control positioning of the stop along the positioning path;
   cutting a first piece of stock with the saw device oriented left of a square cut, and a second piece of stock with the saw device oriented right of a square cut, wherein the first piece and the second piece of stock are cut for calibration of the system;
   measuring a first length of the cut first piece of stock and a second length of the cut second piece of stock;
   entering the first length and the second length into the computer;
   entering into the computer for a third piece of stock (a) a proximal corner angle of the wall structure where a proximal end of the third piece of stock will be fixed, (b) a desired length of the third piece of stock, and (c) a distal corner angle of the wall structure where a distal end of the third piece of stock will be fixed;
   allowing the computer to calculate an appropriate position for the stop and an appropriate orientation for the saw device to cut the third piece of stock, wherein the appropriate position for the stop includes a compensation for an offset of the pivot axis of the saw device from the line, and wherein the compensation is calculated by the computer based on the appropriate orientation for the saw device, the measured first length of the cut first piece of stock, and the measured second length of the cut second piece of stock;
   cutting and installing the third piece of stock;
   allowing the computer to determine an appropriate orientation for the saw device to cut a proximal end of a fourth piece of stock based on the distal corner angle entered for the third piece of stock;
   cutting the proximal end of the fourth piece of stock;
   entering into the computer for the fourth piece of stock (a) a desired length of the fourth piece of stock and (b) a distal corner angle of the wall structure where a distal end of the fourth piece of stock will be fixed;
   allowing the computer to calculate an appropriate position for the stop and an appropriate orientation for the saw device to cut a distal end of the fourth piece of stock;
   cutting the distal end of the fourth piece of stock; and
   installing the fourth piece of stock to form a miter joint with the third piece of stock.

2. The method of claim 1, wherein the pieces of stock are made of a material selected from wood, metal, and plastic.

3. The method of claim 1, wherein entering each corner angle includes entering whether the corner angle represents an inside corner or an outside corner.

4. The method of claim 1, wherein the computer, for each end of the third piece of stock and the fourth piece of stock, displays at least one angle value for pivoting the saw device and an indication of whether the angle value represents pivoting the saw device to the left or to the right.

5. The method of claim 4, wherein the computer displays a first angle value for pivoting the saw device about a vertical axis and a second angle value for pivoting the saw device about a horizontal axis for each end of the third piece of stock and the fourth piece of stock.

6. The method of claim 4, wherein the computer displays a same angle value for pivoting the saw device to cut the distal end of the third piece of stock and the proximal end of the fourth piece of stock.

7. The method of claim 6, wherein the computer displays an indicator of pivoting the saw device to the left to cut the proximal end of the fourth piece of stock if the saw device was pivoted to the right to cut the distal end of the third piece of stock, and wherein the computer displays an indicator of pivoting the saw device to the right to cut the proximal end of the fourth piece of stock if the saw device was pivoted to the left to cut the distal end of the third piece of stock.

8. The method of claim 1, wherein each of the third piece of stock and the fourth piece of stock is installed as crown molding for the wall structure.

9. The method of claim 1, wherein each of the third piece of stock and the fourth piece of stock is installed as base molding for the wall structure.

10. The method of claim 1, further comprising a step of entering a width of the stock.

11. The method of claim 1, wherein the saw device defines a square cutting plane that is orthogonal to the positioning axis, further comprising a step of pivoting the saw device to a first position for cutting the distal end of the third piece of stock and pivoting the saw device to a second position for cutting the proximal end of the fourth piece of stock, and wherein the first and second positions are angularly offset from the square cutting plane by the same amount in opposite rotational directions.

12. The method of claim 1, wherein the distal corner angle, the desired length, or both the distal corner angle and the desired length for the fourth piece of stock are entered after the third piece of stock is cut to its desired length.

13. The method of claim 1, wherein the step of cutting a first piece of stock and a second piece of stock includes a step of making a pair of miter cuts that are angularly offset from a square cut by the same amount in opposite rotational directions and while the stop is at a same position for each of the first piece of stock and the second piece of stock.

14. The method of claim 13, wherein each of the miter cuts is offset by 45 degrees from a square cut.

15. The method of claim 1, wherein the first piece of stock and the third piece of stock are cut at different orientations of the saw device relative to one another, and wherein the second piece of stock and the fourth piece of stock are cut at different orientations of the saw device relative to one another.

16. The method of claim 1, wherein the computer compares each of the first length and the second length to an actual or expected square cut length for a piece of stock cut while the stop is at a same position, to obtain a left difference and a right difference, and wherein the computer calculates the compensation based on the left difference and the right difference.

17. The method of claim 1, wherein the computer calculates the offset of the pivot axis of the saw device from the line using the left difference and the right difference, and wherein the computer calculates the compensation based on the offset of the pivot axis calculated.

18. The method of claim 17, wherein the computer uses the left difference and the right difference to calculate an offset of the pivot axis of the saw device as an X-offset parallel to the positioning path and a Y-offset orthogonal to the positioning path, and wherein the computer calculates the compensation using each of the X-offset and the Y-offset.

19. The method of claim 18, wherein the Y-offset is calculated as an average of the left difference and the right difference, and wherein the X-offset is calculated in part by subtracting one of the left difference and the right difference from the other of the left difference and the right difference.

* * * * *